United States Patent
Nagasaki et al.

(10) Patent No.: US 9,420,813 B2
(45) Date of Patent: *Aug. 23, 2016

(54) SWEETENER

(75) Inventors: Hiroaki Nagasaki, Kawasaki (JP);
Naohiro Miyamura, Kawasaki (JP);
Yuzuru Eto, Kawasaki (JP); Katsuya Seguro, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 12/613,615

(22) Filed: Nov. 6, 2009

(65) Prior Publication Data

US 2010/0183792 A1 Jul. 22, 2010

Related U.S. Application Data

(63) Continuation of application No. PCT/JP2008/058326, filed on May 1, 2008.

(30) Foreign Application Priority Data

May 8, 2007 (JP) .................... 2007-123771

(51) Int. Cl.
A23L 1/236 (2006.01)
A23L 1/22 (2006.01)

(52) U.S. Cl.
CPC .............. *A23L 1/22* (2013.01); *A23L 1/2361* (2013.01); *A23L 1/2362* (2013.01); *A23V 2002/00* (2013.01)

(58) Field of Classification Search
CPC ....... A23L 1/22; A23L 1/2361; A23L 1/2362; A23V 2002/00; A23V 2200/16; A23V 2250/06; A23V 2250/2482; A23V 2250/264; A23V 2250/242
USPC ........................................................ 426/548
See application file for complete search history.

(56) References Cited

U.S. PATENT DOCUMENTS

| | | | |
|---|---|---|---|
| 3,773,526 | A | 11/1973 | Bliznak |
| 4,277,464 | A | 7/1981 | Reussner et al. |
| 4,741,914 | A | 5/1988 | Kimizuka et al. |
| 6,548,096 | B1 | 4/2003 | Amino et al. |
| 2002/0037350 | A1 | 3/2002 | Ishii et al. |
| 2003/0138521 | A1 | 7/2003 | Nishimura et al. |
| 2004/0265471 | A1 | 12/2004 | Kohmura et al. |
| 2005/0238779 | A1 | 10/2005 | Isoya et al. |
| 2009/0239310 | A1 | 9/2009 | Ohsu et al. |
| 2009/0239808 | A1 | 9/2009 | Ohsu et al. |

FOREIGN PATENT DOCUMENTS

| | | |
|---|---|---|
| CN | 1537461 | 10/2004 |
| EP | 1 177 728 | 2/2002 |
| EP | 1 283 015 | 2/2003 |
| JP | 2002-034501 | 2/2002 |
| JP | 2002-051723 | 2/2002 |
| JP | 2003-274896 A | 9/2003 |
| JP | 2004-041118 | 2/2004 |
| JP | 2005-040047 | 2/2005 |
| JP | 2005-304440 | 11/2005 |
| WO | WO98/39979 | 9/1998 |
| WO | WO2006/098510 | 9/2006 |
| WO | WO2007/053393 | 5/2007 |
| WO | WO2007/055388 | 5/2007 |
| WO | WO2008/026629 | 3/2008 |

OTHER PUBLICATIONS

Ohsu et al., Involvement of the Calcium-sensing Receptor in Human Taste Perception, 2010, J Biol. Chem., vol. 285, No. 2, 1016-1022.*
Suzuki, H., et al., "Improvement of the Flavor of Amino Acids and Peptides Using Bacterial γ-Glutamyltranspeptidase," Recents Highlight in Flavor Chemistry & Biology 2007, pp. 227-232, Eds. Hofmann, T., et al., Deutsche Forschungsanstalt für Lebensmittelchemie, Garching, Germany.
International Preliminary Report on Patentability for PCT Patent App. No. PCT/JP2008/058326 (Dec. 3, 2009).
Breitwieser, G. E., et al., "Calcium sensing receptors as integrators of multiple metabolic signals," Cell Calcium 2004;35:209-216.
Brown, E. M., et al., "Cloning and characterization of an extracellular $Ca^{2+}$-sensing receptor from bovine parathyroid," Nature 1993;366:575-580.
McLarnon, S. J., et al., "Physiological and pharmacological agonists of the extracellular $Ca^{2+}$-sensing receptor," Eur. H. Pharmacol. 2002;447:271-278.
Squires, P.E., "Non-Ca2+-homeostatic functions of the extracellular $Ca^{2+}$-sensing receptor (CaR) in endocrine tissues," J. Endocrinol. 2000;165:173-177.
Danner, J., et al., "Interaction of Glutathione Analogues with Hydra attenuata γ-Glutamyltransferase," Biochem. J. 1978;175:547-553.
Kirimura, J., et al., "The Contribution of Peptides and Amino Acids to the Taste of Foodstuffs," J. Agr. Food Chem. 1969;17(4):689-695.
Office Action from Chinese Patent App. No. 200880015295.2 (Oct. 30, 2013) with English translation thereof.
Database WPI, Week 200669, Thomson Scientific, London, GB, XP002693857, Sep. 21, 2006.

(Continued)

*Primary Examiner* — Leslie Wong
(74) *Attorney, Agent, or Firm* — Shelly Guest Cermak; Cermak Nakajima & McGowan LLP

(57) ABSTRACT

The body taste of a sweetener (for example, aspartame, sucralose, acesulfame, etc.) is improved by blending the sweetener with an amino acid or a peptide, which is able to activate a calcium receptor, such as γ-Glu-X-Gly (wherein X represents an amino acid or an amino acid derivative), γ-Glu-Val-Y (wherein Y represents an amino acid or an amino acid derivative), γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-$NH_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, γ-Glu-Cys(S-Me), etc.

7 Claims, 5 Drawing Sheets

(56) References Cited

OTHER PUBLICATIONS

Supplementary European Search Report for EP Patent App. No. 08752256.1 (Apr. 18, 2013).
Preliminary Rejections for Korean Patent App. No. 10-2009-7025373 (May 14, 2014) with English translation thereof.
Office Action from Canadian Patent App. No. 2,686,805 (Feb. 5, 2014).
Decision of Patent Grant for Korean Patent App. No. 10-2009-7025373 (Nov. 18, 2014) with English language translation thereof.
Silve, C., et al., "Delineating a $Ca^{2+}$ Binding Pocket within the Venus Flytrap Module of the Human Calcium-sensing Receptor," J. Biol. Chem. 2005;280(45):37917-37923.
Wang, M., et al., "Activation of Family C G-protein-coupled Receptors by the Tripeptide Glutathione," J. Biol. Chem. 2006;281(13):8864-8870.
International Search Report for PCT Patent App. No. PCT/JP2008/058326 (May 27, 2008).
Patent Examination Report No. 1 issued in the corresponding Australian Patent App. No. 2008249288 (Sep. 1, 2012).
Notice of Reason for Rejection issued in the corresponding Japanese Patent App. No. 2009-514105 (Oct. 9, 2012) with English translation thereof.
Notice of Reason for Rejection issued in the related Japanese Patent App. No. 2011-066637 (Oct. 2, 2012) with partial English translation thereof.

* cited by examiner

SWEETENER

This application is a continuation under 35 U.S.C. §120 of PCT Patent Application No. PCT/JP2008/058326, filed May 1, 2008, which claims priority under 35 U.S.C. §119 to Japanese Patent Application No. 2007-123771, filed on May 8, 2007, which are incorporated in their entireties by reference. The Sequence Listing in electronic format filed herewith is also hereby incorporated by reference in its entirety (File Name: US-417_Seq_List; File Size: 1 KB; Date Created: Nov. 6, 2009).

BACKGROUND OF THE INVENTION

1. Field of the Invention

The present invention relates to a sweetener composition, and an additive agent for use as an ingredient in a sweetener composition, which can improve the body and taste of the sweetener. The present invention also relates to methods for improving the bitterness typical of some substances.

2. Brief Description of the Related Art

In recent years, high-intensity sweeteners (high sweetness sweetener) have been utilized in a wide range of foods, including diet foods. In beverages and confectioneries, which each consume an especially large amount of these sweeteners, high-intensity sweetener compositions have been used as so-called lower-calorie sweeteners, and marketed as calorie-reduced sweeteners, calorie-free sweeteners, and sugar-free sweeteners. Typical examples of these high-intensity sweeteners include aspartame (APM), sucralose, acesulfame-K (Ace-K), neotame, N—[N-[3-(3-hydroxy-4-methoxyphenyl) propyl]-α-aspartyl]-L-phenylalanine 1-methyl ester (hereinafter abbreviated as "ANS9801"), saccharin, stevia, glycyrrhizin, thaumatin, and monellin.

However, in general, consumers have become familiar over the years with the sweet taste of sugar, glucose fructose syrup, and the like, which have also been used in foods in the past, and hence do not often prefer the qualities of the sweet taste of the high-intensity artificial sweeteners as described above. For example, APM is known for its flavor-enhancing effect and its ability to reduce bitterness or astringency when added to substances, but has a strong aftertaste and degrades easily during storage particularly when exposed to heat. Sucralose is highly stable, but can suppress the natural flavors of the food to which it added, and also has a heavy sweet aftertaste. Ace-K is also highly stable, but has a heavy taste and aftertaste, and particularly has a strong bitterness and astringency; therefore, Ace-K is often used in a combination with other high-intensity sweeteners.

The use of these high-intensity sweeteners in combination is one way to modify the qualities of the sweetness of the above-described high-intensity sweeteners (JP 2005-304440 A). Furthermore, the use of these high-intensity sweeteners in combination with other sweeteners such as trehalose and erythritol (JP 2002-51723 A), an α-glucosylated stevia extract (JP 2002-34501 A), and with a dietary fiber (JP 2004-41118 A) have been reported. However, at the present time, these combinations have not sufficiently satisfied consumers who are familiar with the sweetness of sugar or glucose fructose syrup.

The calcium receptor, which is also called the Calcium Sensing Receptor (CaSR), has 1,078 amino acids, and is classified into class C of the seven-transmembrane receptors (G protein-coupled receptor; GPCR). Cloning of the gene for the calcium receptor was reported in 1993 (Nature, 1993, Vol. 366(6455), pp. 575-580), and the calcium receptor is known to cause various cell responses via elevation of intracellular calcium levels, etc., when activated with calcium etc. The nucleotide sequence of the human calcium receptor is registered with GenBank Accession No. NM_000388, and is well conserved in animals.

The calcium receptor may act to promote or suppress biological functions. Therefore, at present, therapeutic agents are appropriately used in the treatment of diseases of the neurological, hepatic, cardiovascular, and digestive systems, and other diseases, depending on the pathological conditions. For example, the calcium receptor is able to detect increased blood calcium in the parathyroid, and then suppress the secretion of the parathyroid hormone (PTH) to correct the blood calcium level. Therefore, reduction of the blood calcium level is expected for a calcium receptor activator. It has actually been reported that when a calcium receptor activator is used to treat secondary hyperparathyroidism in a hemodialysis patient, it reduces the PTH level without increasing the calcium and phosphorus levels.

Since a functional analysis of the calcium receptor has been conducted mainly for calcium homeostasis, the applications have so far mainly focused on bone metabolic diseases in which calcium regulation is involved. However, it has become clear from the results of genetic expression analyses, etc., that the calcium receptor is widely distributed in living bodies other than in the parathyroid and kidney (J. Endocrinol., 2000, Vol. 165(2), pp. 173-177 and Eur. J. Pharmacol., 2002, Vol. 447(2-3), pp. 271-278), and the possibility that the calcium receptor is involved in various biological functions and perhaps even the causes of some diseases has been proposed. For example, there has been speculation that the calcium receptor is involved in the functions of the liver, heart, lung, gastrointestinal tract, lymphocytes and pancreas. It has also been confirmed that the calcium receptor is expressed in a wide range of tissues by analyzing RNAs extracted from rat tissues using RT-PCR. Therefore, the potential applications for activators and inhibitors of the calcium receptor are rapidly increasing.

Moreover, in addition to calcium, cations such as a gadolinium cation, basic peptides such as polyarginine, polyamine such as spermine, amino acids such as phenylalanine, and so forth have been reported as calcium receptor activators (Cell Calcium, 2004, Vol. 35(3), pp. 209-216).

It has also been reported that glutathione (γ-Glu-Cys-Gly), a low molecular weight peptide, is a CaSR activator (J. Biol. Chem., 2006, Vol. 281(13), pp. 8864-8870), but there are no reports of the possibility for the CaSR to be involved in taste reception.

However, it has not been reported that an amino acid or a peptide having a particular structure is useful as a calcium receptor activator. Although peptide derivatives with a sweet taste, such as aspartame, are known, it has not been previously reported that an amino acid or peptide that is able to activate a calcium receptor can improve the quality of the sweetness of a sweet substance. It should be noted that ANS9801 and neotame are described in U.S. Pat. No. 6,548,096 and International Publication NO. WO39979 pamphlet, respectively.

SUMMARY OF THE INVENTION

Aspects of the present invention include providing a sweetener in which the quality of sweet taste, in particular, the body taste and bitterness are improved, and especially, a high-intensity sweetener in which the sweet taste, in particular, the body taste and bitterness are improved. It is another aspect of the present invention to provide an agent to improve the body taste of a sweet substance that is used as an ingredient of the sweetener, and to improve the bitterness typical of the sweet substance.

It has been found that various amino acids and peptides have the ability to activate a calcium receptor, and also that these amino acids and peptides can improve the quality of the sweetness of a high-intensity sweetener.

It is an aspect of the present invention to provide a sweetener comprising a sweet substance and a compound which is able to activate a calcium receptor.

It is a further aspect of the present invention to provide the sweetener as described above, wherein the compound is selected from the group consisting of γ-Glu-X-Gly, γ-Glu-Val-Y, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, γ-Glu-Cys(S-Me), and combinations thereof, wherein X and Y are an amino acid or an amino acid derivative.

It is a further aspect of the present invention to provide the sweetener as described above, wherein X is selected from the group consisting of Cys(SNO), Cys(S-allyl), Gly, Cys(S-Me), Abu, t-Leu, Cle, Alb, Pen, and Ser; and Y is selected from the group consisting of Gly, Val, Glu, Lys, Phe, Ser, Pro, Arg, Asp, Met, Thr, His, Orn, Asn, Cys, Gln, GlyA, and LacA.

It is a further aspect of the present invention to provide the sweetener as described above, wherein the amino acid or peptide is selected from the group consisting of γ-Glu-Val-Gly and γ-Glu-Abu-Gly.

It is a further aspect of the present invention to provide the sweetener as described above, wherein the sweet substance is selected from the group consisting of aspartame, sucralose, acesulfame K, neotame, ANS9801, saccharin, stevia, glycyrrhizin, thaumatin, monatin, and monellin.

It is another aspect of the present invention to provide an additive agent comprising a compound which is able to activate a calcium receptor, and which is added to a sweet substance to improve the body taste of the sweet substance.

It is another aspect of the present invention to provide an additive agent comprising a compound which is able to activate a calcium receptor, and which is added to a sweet substance to improve the bitterness of the sweet substance.

DETAILED DESCRIPTION OF EXEMPLARY EMBODIMENTS

Figure 1:
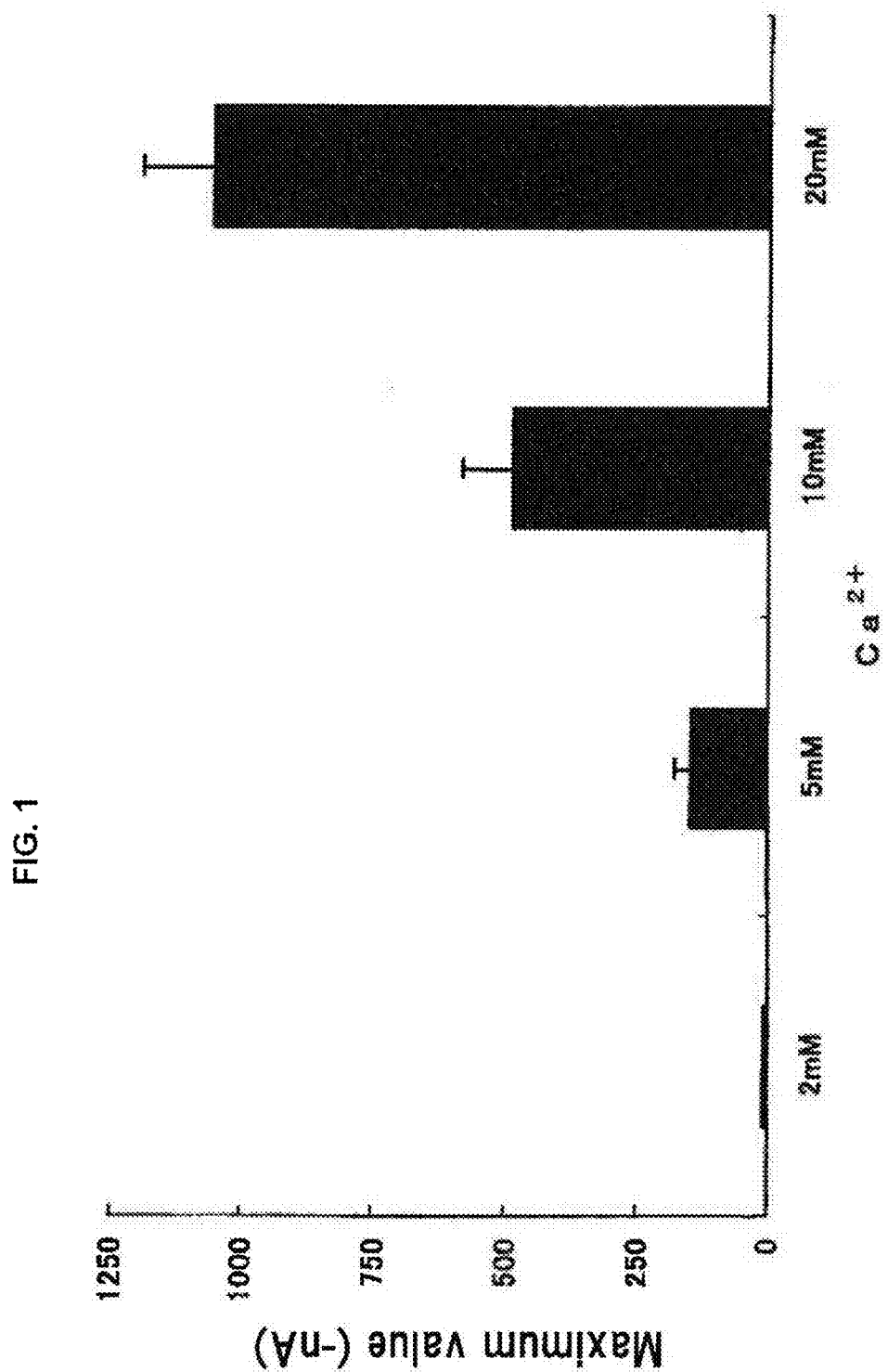
FIG. 1 is a graph showing an effect of calcium on a calcium receptor. cRNA of the human calcium receptor was injected into oocytes of *Xenopus laevis* by microinjection. The intracellular response current values were recorded when a calcium chloride solution was added at an arbitrary concentration. The maximum value of the intracellular currents was defined as the response current value. It was confirmed that no response was observed in oocytes injected with distilled water by microinjection as a control.

Referring to the drawing figures, like reference numerals designate identical or corresponding elements throughout the several figures.

A sweetener containing a sweet substance and a compound is described, and can be a compound such as an amino acid or a peptide that is able to activate a calcium receptor. Furthermore, an additive agent containing a compound which is able to activate a calcium receptor. This additive agent is added to a sweet substance in order to improve the body taste and bitterness of the sweet substance. A sweetener obtained by adding the additive agent containing a compound which is able to activate a calcium receptor is also described.

First, an amino acid or a peptide which is able to activate a calcium receptor is described.

The amino acid or the peptide described herein that is able to activate a calcium receptor can impart kokumi to a food. Furthermore, it has been found that the amino acid or the peptide can improve the body taste and the bitterness of a sweet substance. The term "kokumi" can mean a taste that cannot be described by the five basic tastes, which are sweet, salty, sour, bitter and umami. Therefore, kokumi can mean that the more marginal tastes outside of the basic tastes, such as thickness, growth (mouthfulness), continuity, and harmony, are enhanced, in addition to the basic tastes.

Figure 5:
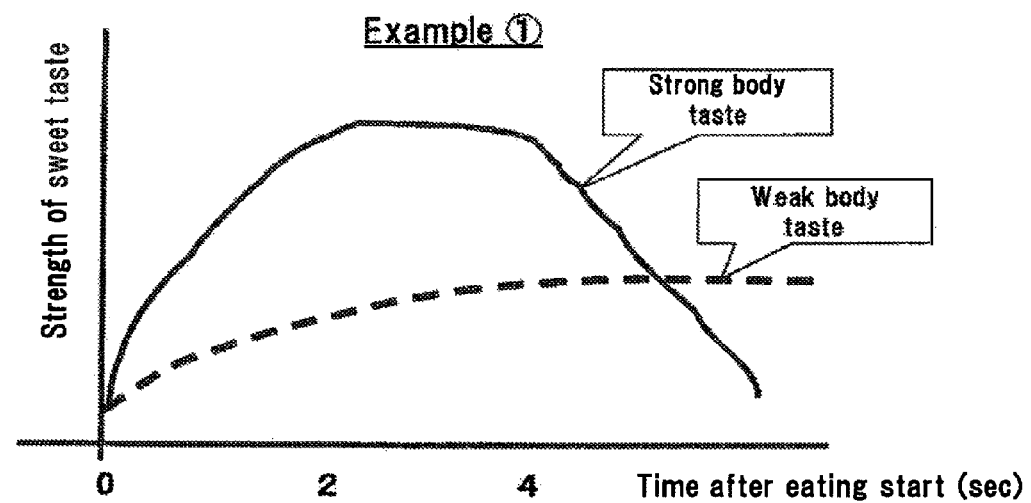
FIG. 5 is a conceptual diagram showing the strength of the body taste of a sweet substance.
Figure 5:
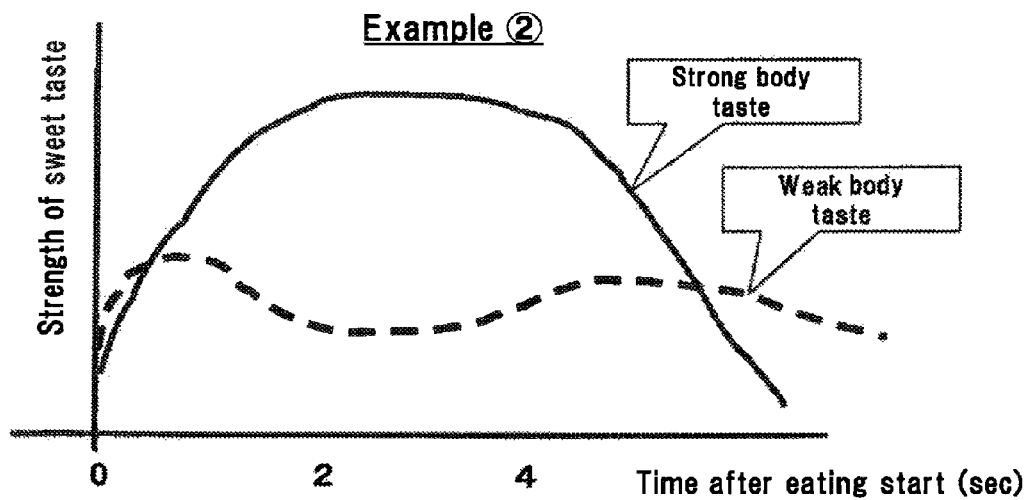

Meanwhile, the term "body taste" when referring to a substance can mean that the substance has harmony and richness during the initial taste and middle taste once placed in the mouth. The phrase "improvement of the body taste" refers to enhancing the body taste. The sense of taste varies with time once the food is placed in the mouth, and the various stages of taste can be sequentially referred to, from immediately after placing the food in the mouth, the initial taste, then the middle taste, and finally the aftertaste. These stages are relative, and typically, initial taste, middle taste and aftertaste occur 0 to 2 seconds, 3 to 4 seconds, and 5 seconds or later after placing the food in the mouth, respectively. FIG. 5 shows a conceptual diagram showing the body taste, in which the ordinate axis represents the strength of the taste, and the abscissa axis represents the time after the food is placed in the mouth. However, FIG. 5 is a conceptual diagram and does not show absolute values.

The term "calcium receptor" can mean a receptor that is called the Calcium Sensing Receptor (CaSR) and belongs to class C of the seven-transmembrane receptors. The term "calcium receptor activator" can mean a substance that binds to, and as a result, activates the calcium receptor. The phrase "to activate a calcium receptor" or "activates the calcium receptor" can mean that a ligand that binds to the calcium receptor and activates a guanine nucleotide binding protein, and thereby transmits a signal. In addition, the term "calcium receptor activity" can mean that the calcium receptor transmits a signal.

Each amino acid or the amino acids that make up each peptide are L-amino acids unless otherwise stated.

<1> Compound Having a Calcium Receptor-Activating Effect

The compound that activates a calcium receptor can be an amino acid, a peptide, derivatives thereof, or various low molecular weight compounds as long as the compound is able to improve the quality of the sweetness of the sweet substance. The compound can also be a novel compound obtained by screening. For example, a calcium receptor can be reacted with a test compound, and calcium receptor activity of the compound can be detected. It can then be confirmed that the compound is able to improve the quality of the sweetness of a sweet substance, in particular, a high-intensity sweetener.

Hereinafter, method steps for screening for compounds which are able to activate a calcium receptor are specifically described, but are not limited these steps:

1) measure a calcium receptor activity by adding a test substance to a calcium receptor activity measurement system;

2) compare the calcium receptor activity with and without the test substance with calcium receptor activity; and 3) select the test substance which exhibits a calcium receptor-activating effect when the test substance is added.

The calcium receptor activity is measured by a measurement system using cells that express calcium receptors, for example. These cells can be cells that endogenously express calcium receptors, or can be recombinant cells into which an exogenous calcium receptor gene is introduced. The calcium receptor activity measurement system described above can be used without any particular limitation as long as, when an extracellular ligand (activator) specific to a calcium receptor is added to the above-described cells that express calcium receptors, the measurement system can detect the binding (reaction) between the activator and the calcium receptor, or can respond to the binding (reaction) between the activator and the calcium receptor, to thereby transmit a detectable signal into the cells. When calcium receptor activity is detected via the reaction with the test substance, the test substance is said to be able to activate or stimulate a calcium receptor, and is a substance that may improve the quality of the sweetness of a sweet substance.

The improvement of the quality of the sweetness of a sweet substance can be confirmed by a method such as a taste test by humans. Although the amino acids and peptides are not particularly limited, the peptide can have 2 to 10 amino acid residues, or a derivative thereof, and can have 2 or 3 amino acid residues, or a derivative thereof. The amino acid residue at the N-terminal of the peptide can be γ-glutamic acid.

Examples of the calcium receptor can include a calcium receptor derived from, or native to, an animal such as a mouse, rat, and dog, as well as human, and the origin of the calcium receptor is not particularly limited.

As described above, the calcium receptor activity can be confirmed by using live cells expressing a calcium receptor or its fragment, cell membranes expressing a calcium receptor or its fragment, an in vitro system containing a calcium receptor or its fragment, or the like.

An example using live cells is described below. However, confirmation of the calcium receptor activity is not limited to the method used in this example.

A calcium receptor can be expressed in cultured cells such as *Xenopus laevis* oocytes, hamster ovarian cells, or human fetal kidney cells. The calcium receptor can be expressed by cloning a calcium receptor gene in a plasmid that contains a foreign gene, and introducing the plasmid or cRNA into the cells. To detect the reaction, an electrophysiological technique and a fluorescent indicator that indicates an increase in the intracellular calcium level can be used.

Expression of the calcium receptor is first confirmed based on the response to calcium or a known activator. Oocytes in which intracellular current is observed in response to 5 mM of calcium, or cultured cells in which fluorescence of the fluorescent indicator reagent is observed in response to 5 mM of calcium, can be used. The calcium concentration dependency is determined by changing the calcium concentration. Then, a test substance such as a peptide is prepared to a concentration of about 1 μM to 1 mM, and added to the oocytes or cultured cells, and the calcium receptor activity of the peptide is determined.

Examples of the compound used in the present invention include various amino acids, peptides, derivatives thereof, or various low molecular weight compounds that are able to activate a calcium receptor. Hereinafter, the terms "amino acid" or "peptide" can mean both an amino acid and an amino acid derivative, and a peptide and a peptide derivative, respectively. The amino acid or the peptide can improve the body taste and/or bitterness of a sweet substance, when the amino acid or the peptide is eaten with the sweet substance. Examples of such an amino acid or a peptide include γ-Glu-X-Gly where X can be an amino acid or an amino acid derivative, γ-Glu-Val-Y where Y can be an amino acid or an amino acid derivative, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, and γ-Glu-Cys(S-Me). One of these peptides or the like can be used, or two or more can be used in combination.

Furthermore, the peptide may be a peptide derivative having the structure of γ-Glu-X—OCH(Z)CO$_2$H, wherein X can be an amino acid or an amino acid derivative, and Z can be H (a hydrogen atom) or CH$_3$ (a methyl group). The peptide can be γ-Glu-Val-Y in which Y can be GlyA or LacA. Specific examples thereof include γ-Glu-Val-GlyA, γ-Glu-tLeu-GlyA, γ-Glu-Abu-GlyA, γ-Glu-Val-LacA, γ-Glu-tLeu-LacA and γ-Glu-Abu-LacA. It should be noted that GlyA can be glycolic acid, and LacA can be lactic acid. Lactic acid can be either S-lactic acid or R-lactic acid. Structural formulae of those compounds are shown below.

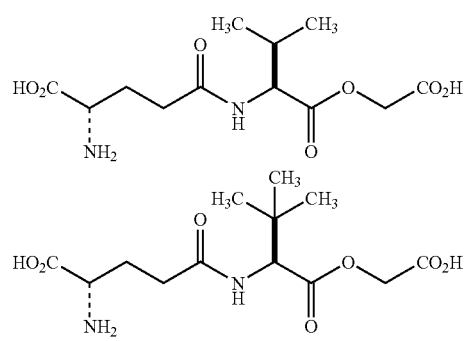

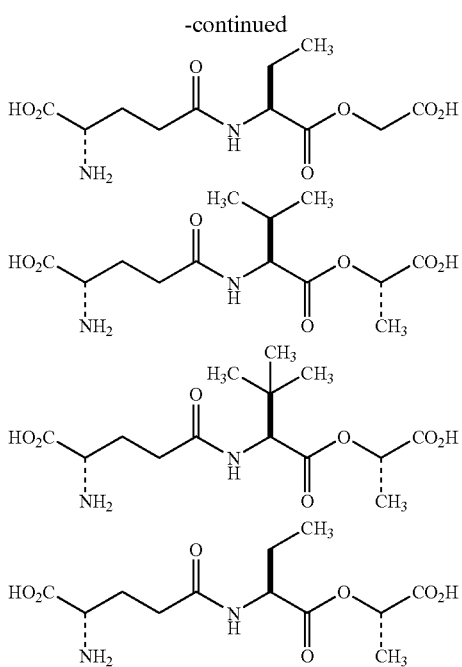

Examples of the amino acid include a neutral amino acid such as Gly, Ala, Val, Leu, Ile, Ser, Thr, Cys, Met, Asn, Gln, Pro, Hyp and t-Leu, an acidic amino acid such as Asp and Glu, a basic amino acid such as Lys, Arg and His, an aromatic amino acid such as Phe, Tyr and Trp, and homoserine, citrulline, ornithine, α-aminobutyric acid, norvaline, norleucine and taurine. The amino acid can also be a non-naturally occurring (non-protein constituent) amino acid such as tert-leucine, cycloleucine, α-aminoisobutyric acid and L-penicillamine. It should be noted that X in the peptide γ-Glu-X-Gly can be any one of the above-described amino acids or a derivative thereof, and can be an amino acid or a derivative thereof, other than Cys.

Herein, abbreviations for amino acid residues are as follows:
(1) Gly: Glycine
(2) Ala: Alanine
(3) Val: Valine
(4) Leu: Leucine
(5) Ile: Isoleucine
(6) Met: Methionine
(7) Phe: Phenylalanine
(8) Tyr: Tyrosine
(9) Trp: Tryptophan
(10) His: Histidine
(11) Lys: Lysine
(12) Arg: Arginine
(13) Ser: Serine
(14) Thr: Threonine
(15) Asp: Aspartic acid
(16) Glu: Glutamic acid
(17) Asn: Asparagine
(18) Gln: Glutamine
(19) Cys: Cysteine
(20) Pro: Proline
(21) Orn: Ornithine
(22) Sar: Sarcosine
(23) Cit: Citrulline
(24) N-Val: Norvaline
(25) N-Leu: Norleucine
(26) Abu: α-Aminobutyric acid
(27) Tau: Taurine
(28) Hyp: Hydroxyproline
(29) t-Leu: tert-Leucine
(30) Cle: Cycloleucine
(31) Aib: α-Aminoisobutyric acid (2-methylalanine)
(32) Pen: L-Penicillamine Examples of amino acid derivatives include various derivatives of the above amino acids such as an unusual amino acid, a non-natural amino acid, an amino alcohol and a substituted amino acid with a side chain such as the terminal carbonyl group, the terminal amino group, and the thiol group of cysteine, that can contain various substituents. Examples of the substituents include an alkyl group, an acyl group, a hydroxy group, an amino group, an alkylamino group, a nitro group, a sulfonyl group and various protective groups, specifically include Arg(NO₂): N-γ-nitroarginine, Cys(SNO): S-nitrocysteine, Cys(S-Me): S-methylcysteine, Cys(S-allyl): S-allylcysteine, Val-NH₂: valinamide, Val-ol: valinol (2-amino-3-methyl-1-butanol).

It should be noted that γ-Glu-Cys(SNO)-Gly has the following structural formula, and the "(O)" in the above formulae γ-Glu-Met(O) and γ-Glu-Cys(S-Me)(O) can indicate a sulfoxide structure. The "(γ)" in the formula γ-Glu can indicate that glutamic acid binds to another amino acid via the carboxy group at the γ-position in glutamic acid.

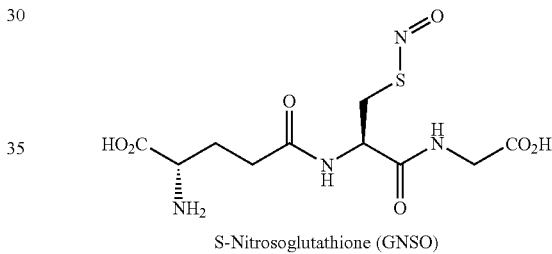

S-Nitrosoglutathione (GNSO)

γ-Glu-X-Gly where X can be an amino acid or an amino acid derivative, γ-Glu-Val-Y where Y can be an amino acid or an amino acid derivative, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH₂, γ-Glu-Val-ol, γ-Glu-Ser, γ-Glu-Tau, γ-Glu-Cys(S-Me)(O), γ-Glu-Leu, γ-Glu-Ile, γ-Glu-t-Leu and γ-Glu-Cys(S-Me) can each improve the body taste and bitterness of a sweet substance.

Therefore, γ-Glu-X-Gly where X can be an amino acid or an amino acid derivative, γ-Glu-Val-Y where Y can be an amino acid or an amino acid derivative, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH₂, γ-Glu-Val-ol, γ-Glu-Ser, γ-Glu-Tau, γ-Glu-Cys(S-Me)(O), γ-Glu-Leu, γ-Glu-Ile, γ-Glu-t-Leu and γ-Glu-Cys(S-Me) can be used as an additive agent. This additive agent can be added to a sweet substance to improve the body taste and bitterness of the sweet substance.

The compound or agent can be used alone or can be used as a random mixture of two or more kinds of compounds. Such mixtures can include γ-Glu-X-Gly where X can be Cys (SNO), Cys(S-allyl), Gly, Cys(S-Me), Abu, t-Leu, Cle, Aib, Pen or Ser, or γ-Glu-Val-Y where Y can be Gly, Val, Glu, Lys, Phe, Ser, Pro, Arg, Asp, Met, Thr, His, Orn, Asn, Cys, Gln, GlyA or LacA.

As the above-described compound, a compound which is commercially-available can be used. When the compound is a peptide, the peptide can be obtained by appropriately using a known technique such as chemically synthesizing the peptide or synthesizing the peptide by an enzymatic reaction. Since the number of amino acid residues in which make up the peptide is usually small, such as 2 or 3 residues, chemically synthesizing the peptide can be convenient. When the peptide is chemically synthesized, the oligopeptide can be synthesized or semi-synthesized by using a peptide synthesizer. Chemically synthesizing the peptide includes synthesizing the peptide by a solid phase synthetic method. The peptide synthesized as described above can be purified by usual means such as ion exchange chromatography, reversed phase high performance liquid chromatography or affinity chromatography. The peptide solid phase synthetic method and the subsequent peptide purification are well known in the technical field.

The peptide can also be produced by an enzymatic reaction. For example, the method described in International Publication NO. WO2004/011653 pamphlet can be used. That is, the peptide can also be produced by reacting an amino acid or dipeptide having an esterified or amidated carboxyl terminus with an amino acid having a free amino group (for example, an amino acid with a protected carboxyl group) in the presence of a peptide-producing enzyme, and purifying the produced dipeptide or tripeptide. The peptide-producing enzyme can be a part of a culture of a microorganism having the ability to produce the peptide, microbial cells separated from the culture or a processed product of cells of the microorganism, or a peptide-producing enzyme derived from the microorganism.

It should be noted that the above-described methods are not the only means for obtaining the peptide. The peptide can also be present in, for example, a plant such as a vegetable or a fruit, a microorganism such as yeast and yeast extract. When the peptide is present in natural products, the peptide can be extracted from those natural products before use.

The peptide does not need to be isolated before use, and a fraction containing the peptide in a large amount can also be used.

Examples of the low molecular weight compounds include cinacalcet ((R)—N-(3-(3-(trifluoromethyl)phenyl)propyl)-1-(1-naphthyl)ethylamine) and analogous compounds thereof. Examples of an analogous compound of cinacalcet include the compound represented by the chemical formula (1); ((R)—N-[(4-ethoxy-3-methylphenyl)methyl]-1-(1-naphthyl)ethylamine)), or the compound represented by the following chemical formula (2); ((R)—N-(3-phenylprop-2-enyl)-1-(3-methoxyphenyl)ethylamine). These compounds can be synthesized by a known method, such as described in U.S. Pat. No. 6,211,244, for example. Furthermore, commercially available products can also be used.

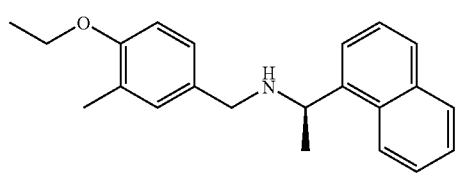

(1)

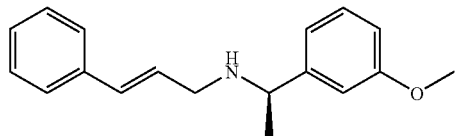

(2)

The compound can also be in the form of a salt. When the peptide and the amino acid are in the form of a salt, the salt can be a pharmacologically acceptable salt. Examples of a salt with an acidic group such as a carboxyl group in the formula include an ammonium salt, a salt with an alkali metal such as sodium and potassium, a salt with an alkaline earth metal such as calcium and magnesium, an aluminum salt, a zinc salt, a salt with an organic amine such as triethylamine, ethanolamine, morpholine, pyrrolidine, piperidine, piperazine and dicyclohexylamine, and a salt with a basic amino acid such as arginine and lysine. Examples of a salt with a basic group include a salt with an inorganic acid such as hydrochloric acid, sulfuric acid, phosphoric acid, nitric acid and hydrobromic acid, a salt with an organic carboxylic acid such as acetic acid, citric acid, benzoic acid, maleic acid, fumaric acid, tartaric acid, succinic acid, tannic acid, butyric acid, hibenzoic acid, pamoic acid, enanthoic acid, decanoic acid, teoclic acid, salicylic acid, lactic acid, oxalic acid, mandelic acid and malic acid, and a salt with an organic sulfonic acid such as methanesulfonic acid, benzenesulfonic acid and p-toluenesulfonic acid.

<2> Additive Agent and Sweetener

The compound, such as the peptide and the amino acids as described above, can be used as an agent that is added to a sweet substance in order to improve the body taste of the sweet substance. The peptide and the amino acid can also be used as an agent that is added to a sweet substance in order to improve the bitterness of the sweet substance.

The compound can be used alone or as a mixture of two or more kinds. The compound can also be mixed with a sweet substance to form a sweetener.

The agent can be only one kind or two or more kinds of compounds chosen from the above-described compound. Furthermore, the agent can be formed by optionally adding other compounds, or various additives, each being able to improve the quality of the sweetness of the sweetener.

The amount of the additive agent to be added to the sweet substance is not particularly limited as long as the amount can improve the quality of the sweetness of the sweet substance, in particular, the body taste. The specific amount of the compound can be, for example, 0.000001% to 99.9999% by weight, or in another example 0.00001% to 99.999% by weight, or in another example 0.0001% to 99.99% by weight with respect to the high-intensity sweetener.

It should be noted that the above description is in reference to the mixture proportion with respect to the high-intensity sweetener, and the amount of the compound in a food or a beverage can be 1 ppb to 99.9% by weight, or in another example 10 ppb to 10% by weight, or in another example 1 ppm to 1% by weight.

The sweetener can contain the sweet substance and the compound as described above. The compound can be used alone or as a mixture of two or more kinds.

As the sweet substance, a high-intensity sweetener can be used, and examples thereof include aspartame, sucralose, acesulfame K, neotame, ANS9801, saccharin, stevia, glycyrrhizin, thaumatin, monatin and monellin.

The sweet substance can be used alone or as a mixture of two or more kinds. It is known that a mixture of multiple sweet substances can improve the body taste of each of the sweet substances. However, the combined use of the peptide or the amino acid with the sweet substances can further improve the body taste. Examples of a combination of the sweet substances includes a combination of two kinds optionally selected from aspartame, sucralose and acesulfame-K, or a combination of these three kinds.

It should be noted that an example of the combination includes a combination of aspartame and γ-Glu-Val-Gly, which is known to have a high effect. Specifically, aspartame can be mixed so that the weight proportion can be 0.1 to 500 parts by weight with respect to 100 parts by weight of aspartame. As a matter of course, this is merely one example of a mixture, and there is no need to be restricted to this proportion.

The sweetener can of course be mixed with common sweeteners such as sucrose, glucose, fructose and sugar alcohols (for example, erythritol and maltitol). Examples of the form of the sweetener include a powder, a granule and a liquid, and the physical properties are not limited.

EXAMPLES

Hereinafter, the present invention is more specifically described with reference to the following non-limiting examples.

Reference Example 1

Preparation of a Calcium Receptor Gene (cRNA)

The gene encoding the calcium receptor was prepared as follows. On the basis of the DNA sequence registered at NCBI (calcium receptor: NM_000388), synthetic oligo DNAs (forward primer (SEQ ID NO: 1) and reverse primer (SEQ ID NO: 2)) were synthesized.

PCR was performed by using the primers and Pfu ultra DNA Polymerase (manufactured by Stratagene) under the following conditions by using human kidney cDNA (manufactured by Clontech) as a source. After a reaction at 94° C. for 3 minutes, a cycle of reactions at 94° C. for 30 seconds, 55° C. for 30 seconds and 72° C. for 2 minutes was repeated 35 times, and then a reaction was performed at 72° C. for 7 minutes. Whether amplification was attained by PCR was confirmed by performing agarose electrophoresis of DNA, staining the DNA with a DNA staining reagent, and subsequent ultraviolet irradiation. The chain lengths of the PCR products were confirmed by comparison with DNA markers of known sizes simultaneously subjected to the electrophoresis. The plasmid vector pBR322 was digested with the restriction enzyme EcoRV (manufactured by Takara). The gene fragment amplified by PCR was ligated to the cleavage site of the plasmid by using Ligation Kit (manufactured by Promega). The *Escherichia coli* DH5α strain was transformed with each ligation reaction solution, and a transformant harboring the plasmid in which the PCR amplification product was cloned was selected. The PCR amplification product was confirmed by DNA base sequence analysis. By using the recombinant plasmid as a template together with a cRNA preparation kit (manufactured by Ambion), cRNA of the calcium receptor gene was prepared.

Reference Example 2

Preparation of Various Samples

As L-amino acid samples, 23 kinds of special grade amino acids including alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, ornithine and taurine (all from Ajinomoto Co., Inc.), and hydroxyproline (Nacarai Tesque, Inc.), were used. For D-Cys and D-Trp (Nacarai Tesque, Inc.) and calcium chloride, a special grade was used.

Furthermore, as peptide sample, γ-Glu-Cys-Gly (Sigma Aldrich Japan K.K.), γ-Glu-Cys(SNO)-Gly (Dojindo Laboratories), γ-Glu-Ala (Bachem Feinchemikalien AG), γ-Glu-Gly (Bachem Feinchemikalien AG), γ-Glu-Cys (Sigma Aldrich Japan K.K.), γ-Glu-Met (Bachem Feinchemikalien AG), γ-Glu-Abu-Gly (Abu: α-aminobutyric acid, Bachem Feinchemikalien AG), γ-Glu-Thr (Kokusan Chemical Co., Ltd.), γ-Glu-Val (Kokusan Chemical Co., Ltd.), γ-Glu-Leu (custom synthesis product), γ-Glu-Ile (custom synthesis product), γ-Glu-Orn (Kokusan Chemical Co., Ltd.), Asp-Gly (custom synthesis product), Cys-Gly (custom synthesis product), Cys-Met (custom synthesis product), Glu-Cys (custom synthesis product), Gly-Cys (custom synthesis product), Leu-Asp (custom synthesis product), γ-Glu-Val-Val (custom synthesis product), γ-Glu-Val-Glu (custom synthesis product), γ-Glu-Val-Lys (custom synthesis product), γ-Glu-γ-Glu-Val (custom synthesis product), γ-Glu-Gly-Gly (custom synthesis product), γ-Glu-Val-Phe (custom synthesis product), γ-Glu-Val-Ser (custom synthesis product), γ-Glu-Val-Pro (custom synthesis product), γ-Glu-Val-Arg (custom synthesis product), γ-Glu-Val-Asp (custom synthesis product), γ-Glu-Val-Met (custom synthesis product), γ-Glu-Val-Thr (custom synthesis product), γ-Glu-Val-His (custom synthesis product), γ-Glu-Val-Asn (custom synthesis product), γ-Glu-Val-Gln (custom synthesis product), γ-Glu-Val-Cys (custom synthesis product), γ-Glu-Val-Orn (custom synthesis product) and γ-Glu-Ser-Gly (custom synthesis product) were used. Glutamine and cysteine were prepared upon use, and the other samples were stored at −20° C. after preparation. The peptides had a purity of 90% or higher, except for γ-Glu-Cys, which was 80% or higher.

After dissolving each sample in solution, if the pH of the solution is either acidic or alkaline, the pH was adjusted to an approximately neutral pH by using NaOH or HCl. The composition of the solution used for dissolution of amino acids and peptides, and the solution used for preparation of *Xenopus laevis* oocytes and culture of the oocytes are as follows: 96 mM NaCl, 2 mM KCl, 1 mM $MgCl_2$, 1.8 mM $CaCl_2$, 5 mM Hepes, and pH 7.2.

Reference Example 3

Synthesis of γ-Glu-Val-Gly

Boc-Val-OH (8.69 g, 40.0 mmol) and Gly-OBzl.HCl (8.07 g, 40.0 mmol) were dissolved in methylene chloride (100 ml), and the solution was kept at 0° C. Triethylamine (6.13 ml, 44.0 mmol), HOBt (1-hydroxybenzotriazole, 6.74 g, 44.0 mmol) and WSC.HCl (1-ethyl-3-(3-dimethylaminopropyl) carbodiimide hydrochloride, 8.44 g, 44.0 mmol) were added to the solution, and the mixture was stirred overnight at room temperature. The reaction solution was concentrated under reduced pressure, and the residue was dissolved in ethyl acetate (200 ml). The solution was washed with water (50 ml), 5% of citric acid aqueous solution (50 ml× twice), saturated brine (50 ml), 5% of sodium hydrogen carbonate aqueous solution (50 ml× twice), and saturated brine (50 ml) again. The organic layer was dried over anhydrous magnesium sulfate, magnesium sulfate was removed by filtration, and the filtrate was concentrated under reduced pressure. The residue was recrystallized from ethyl acetate/n-hexane to obtain Boc-Val-Gly-OBzl (13.2 g, 36.2 mmol) as a white crystal.

Boc-Val-Gly-OBzl (5.47 g, 15.0 mmol) was added to 4N HCl/dioxane solution (40 ml), and the mixture was stirred at room temperature for 50 minutes. Dioxane was removed by concentration under reduced pressure, n-hexane (30 ml) was added to the residue, and the mixture was concentrated under reduced pressure. The procedure was repeated 3 times to quantitatively obtain H-Val-Gly-OBzl.HCl.

H-Val-Gly-OBzl.HCl and Z-Glu-OBzl (5.57 g, 15.0 mmol) described above was dissolved in methylene chloride (50 ml), and the solution was maintained at 0° C. Triethylamine (2.30 ml, 16.5 mmol), HOBt (1-hydroxybenzotriazole, 2.53 g, 16.5 mmol) and WSC.HCl (1-ethyl-3-(3-dimethylaminopropyl)carbodiimide hydrochloride, 3.16 g, 16.5 mmol) were added to the solution, and the mixture was stirred at room temperature overnight for 2 days. The reaction solution was concentrated under reduced pressure, and the residue was dissolved in heated ethyl acetate (1,500 ml). The solution was washed with water (200 ml), 5% of citric acid aqueous solution (200 ml×twice), saturated brine (150 ml), 5% sodium hydrogen carbonate aqueous solution (200 ml×twice) and saturated brine (150 ml) again. The organic layer was dried over anhydrous magnesium sulfate, magnesium sulfate was removed by filtration, and the filtrate was concentrated under reduced pressure. The precipitated crystal was collected by filtration and dried under reduced pressure to obtain Z-Glu(Val-Gly-OBzl)-OBzl (6.51 g, 10.5 mmol) as a white crystal.

Z-Glu(Val-Gly-OBzl)-OBzl (6.20 g, 10.03 mmol) described above was suspended in ethanol (200 ml), 10% palladium on carbon (1.50 g) was added to the suspension, and a reduction reaction was performed under a hydrogen atmosphere at 55° C. for 5 hours. During the reaction, 100 ml in a total volume of water was gradually added. The catalyst was removed by filtration using a Kiriyama funnel, and the filtrate was concentrated under reduced pressure to a half volume. The reaction solution was further filtered through a membrane filter, and the filtrate was concentrated under reduced pressure. The residue was dissolved in a small volume of water, and to the solution, ethanol was added to precipitate a crystal, and the crystal was collected by filtration and dried under reduced pressure to obtain γ-Glu-Val-Gly as a white powder (2.85 g, 9.40 mmol).

ESI-MS: $(M+H)^+=304.1$.

$^1$H-NMR (400 MHz, $D_2O$) δ (ppm): 0.87 (3H, d, J=6.8 Hz), 0.88 (3H, d, J=6.8 Hz), 1.99-2.09 (3H, m), 2.38-2.51 (2H, m) 3.72 (1H, t, J=6.35 Hz), 3.86 (1H, d, J=17.8 Hz), 3.80 (1H, d, J=17.8 Hz), 4.07 (1H, d, J=6.8 Hz).

Reference Example 4

Synthesis of γ-Glu-Cys(S-Me)-Gly [Cys(S-Me): S-methylcysteine]

Reduced glutathione (15.0 g, 48.8 mmol) was added to water (45 ml), and sodium hydroxide (4.52 g, 2.2 equivalents, 107 mmol) was added portionwise to the mixture while the mixture was bubbled with nitrogen. Methyl iodide (4.56 ml, 1.5 equivalents, 73 mmol) was added to the mixture, and the solution was sealed and stirred at room temperature for 2 hours. The reaction solution was adjusted to pH 2 to 3 with concentrated hydrochloric acid, and ethanol (150 ml) was added to the reaction solution, and stored overnight in a refrigerator. An oily product which separated from the supernatant was removed. When the remaining oily product was dissolved in water, and ethanol was gradually added to the solution, a partially crystallized oily product precipitated. The supernatant was removed again. The residue was dissolved in water (300 ml), adsorbed to a column filled with an ion exchange resin (Dowex 1-acetate, 400 ml), washed with water, and then eluted with a 1N acetic acid aqueous solution. The eluate was concentrated under reduced pressure, and reprecipitated from water/ethanol to obtain γ-Glu-Cys(S-Me)-Gly as a white powder (5.08 g, 15.8 mmol).

FAB-MS: $(M+H)^+=322$.

$^1$H-NMR (400 MHz, $D_2O$) δ (ppm): 2.14 (3H, s), 2.15-2.22 (2H, m), 2.50-2.58 (2H, m), 2.86 (1H, dd, J=9.0 Hz, J=14.0 Hz), 3.03 (1H, dd, J=5.0 Hz, J=14.0 Hz), 3.84 (1H, t, J=6.5 Hz), 3.99 (2H, s), 4.59 (1H, dd, J=5.0 Hz, J=9.0 Hz)

Reference Example 5

Synthesis of Other Peptides

γ-Glu-Met(O), γ-Glu-Val-$NH_2$, γ-Glu-Val-ol, γ-Glu-Ser, γ-Glu-Tau, γ-Glu-Cys(S-Me)(O), γ-Glu-t-Leu, γ-Glu-Cys(S-allyl)-Gly and γ-Glu-Cys(S-Me) were synthesized in accordance with Examples 3 and 4.

Reference Example 6

Evaluation of the Calcium Receptor-Activating Effect

For evaluation of the calcium receptor-activating effect, Ca ion concentration-dependent Cl ionic current measuring method using a *Xenopus laevis* oocyte expression system was used. If activator is added to *Xenopus laevis* oocytes in which the calcium receptor is expressed, intracellular Ca ions increase. Then, the Ca ion concentration-dependent Cl channel opens, and the intracellular current value changes as an ionic current. By measuring the change in the intracellular current value, whether the calcium receptor-activating effect is present or not can be determined.

Specifically, the abdomen of *Xenopus laevis* was opened, and an egg batch was taken out and then treated with a 1% collagenase solution at 20° C. for 2 hours to obtain individual oocytes. Into each oocyte, 50 nl of 1 μg/μl receptor cRNA or 50 nl of sterilized water per oocyte were injected by using a micro glass capillary, and the oocytes were cultured at 18° C. for 2 to 3 days. For the culture, a solution obtained by adding 2 mM of pyruvic acid, 10 U/ml of penicillin and 10 μg/ml of streptomycin to the solution in Reference Example 2 was used. After the culture, a test solution was added to the oocytes injected with cRNA or sterilized water. Electrophysiological measurement was performed by using an amplifier Geneclamp 500 (manufactured by Axon) and recording software AxoScope 9.0 (manufactured by Axon). The oocytes were voltage-clamped at −70 mV by the double electrode voltage clamp method, and the intracellular current via the Ca ion concentration-dependent Cl ion was measured. The maximum value of the intracellular currents was defined as the response current value.

Reference Example 7

Evaluation of Effect of Calcium for Activating Calcium Receptor

The calcium receptor-activating effect was evaluated by using the method described in Reference Example 6. That is, oocytes injected with cRNA of the calcium receptor or sterilized water was prepared, and voltage-clamped at −70 mV by the double electrode voltage clamp method. To the voltage-clamped oocytes, calcium was added (2 mM, 5 mM, 10 mM and 20 mM), and then Ca ion concentration-dependent Cl response current was measured. FIG. 1 shows the results. From the results, it was confirmed that cRNA of the calcium receptor injected into the oocytes was functionally expressed. Furthermore, because the oocytes injected with water did not respond to even a high concentration of calcium, it was confirmed that the calcium receptor was not expressed in the oocytes themselves.

Reference Example 8

Evaluation of Effect of L-Amino Acids for Activating Calcium Receptor

Figure 2:
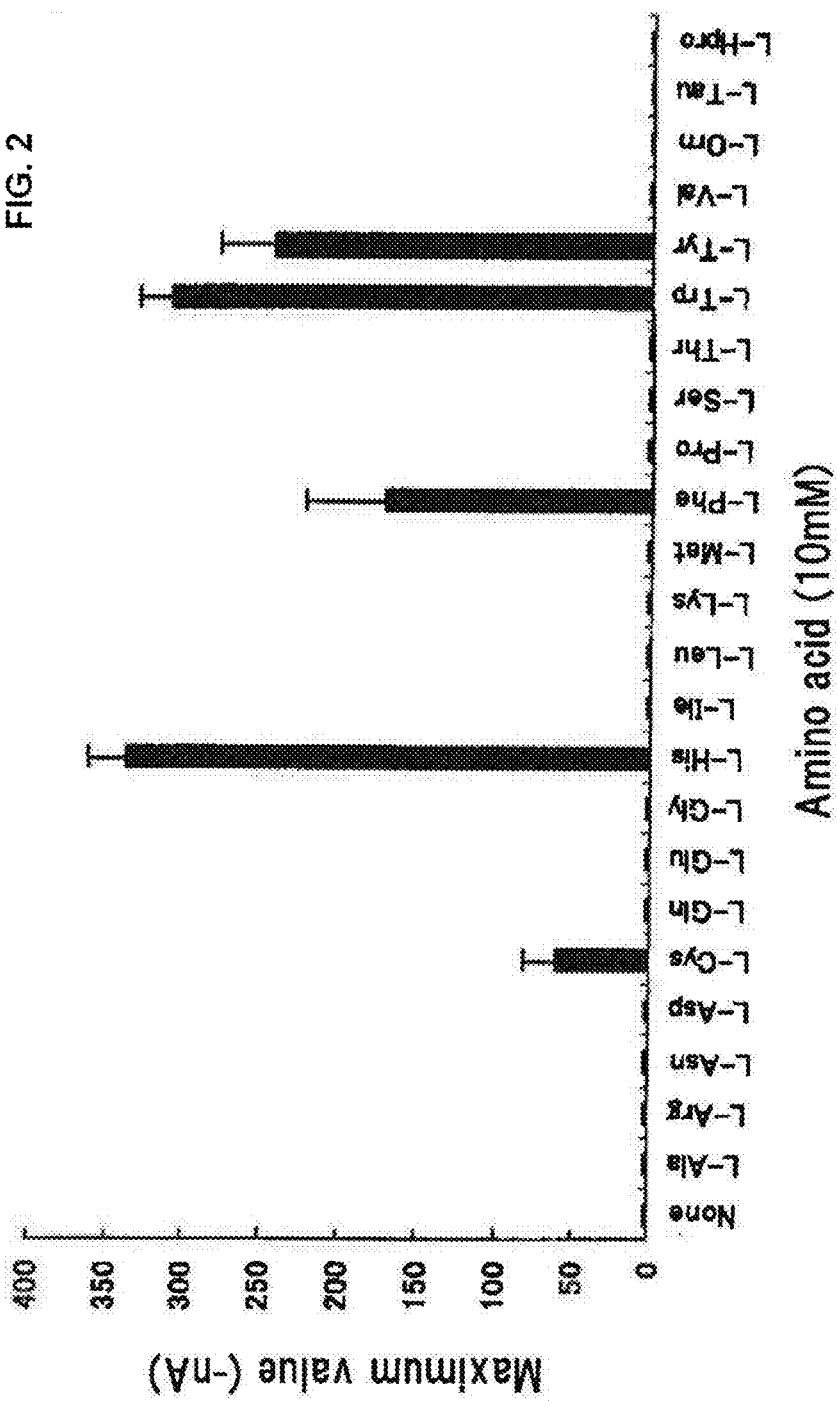
FIG. 2 is a graph showing an effect of an L-amino acid on a calcium receptor. cRNA of the human calcium receptor was injected into oocytes of *Xenopus laevis* by microinjection. The intracellular response current values were recorded when a 10 mM L-amino acid solution was added. The maximum value of the intracellular currents was defined as the response current value. It was confirmed that no response was observed in oocytes injected with distilled water by microinjection as a control.

The ability of L-amino acids to activate the calcium receptor was evaluated by using the method described in Reference Example 6. That is, oocytes injected with cRNA of the calcium receptor or sterilized water were prepared, and voltage-clamped at −70 mV by the double electrode voltage clamp method. To the voltage-clamped oocytes, alanine (10 mM), arginine (10 mM), asparagine (10 mM), aspartic acid (10 mM), cysteine (10 mM), glutamine (10 mM), glutamic acid (10 mM), glycine (10 mM), histidine (10 mM), isoleucine (10 mM), leucine (10 mM), lysine (10 mM), methionine (10 mM), phenylalanine (10 mM), proline (10 mM), serine (10 mM), threonine (10 mM), tryptophan (10 mM), tyrosine (10 mM), valine (10 mM), ornithine (10 mM), taurine (10 mM) or hydroxyproline (10 mM) was added, and Ca ion concentration-dependent Cl response current was measured. FIG. 2 shows the results. From the results, it is demonstrated that cysteine, histidine, phenylalanine, tryptophan and tyrosine each had a definite calcium receptor-activating effect. The activating effect of the above-described amino acids was reported in Proc. Natl. Acad. Sci. USA, Apr. 25, 2000, 97(9): 4814-9.

Reference Example 9

Evaluation of Effect of D-Cysteine for Activating Calcium Receptor

Figure 3:
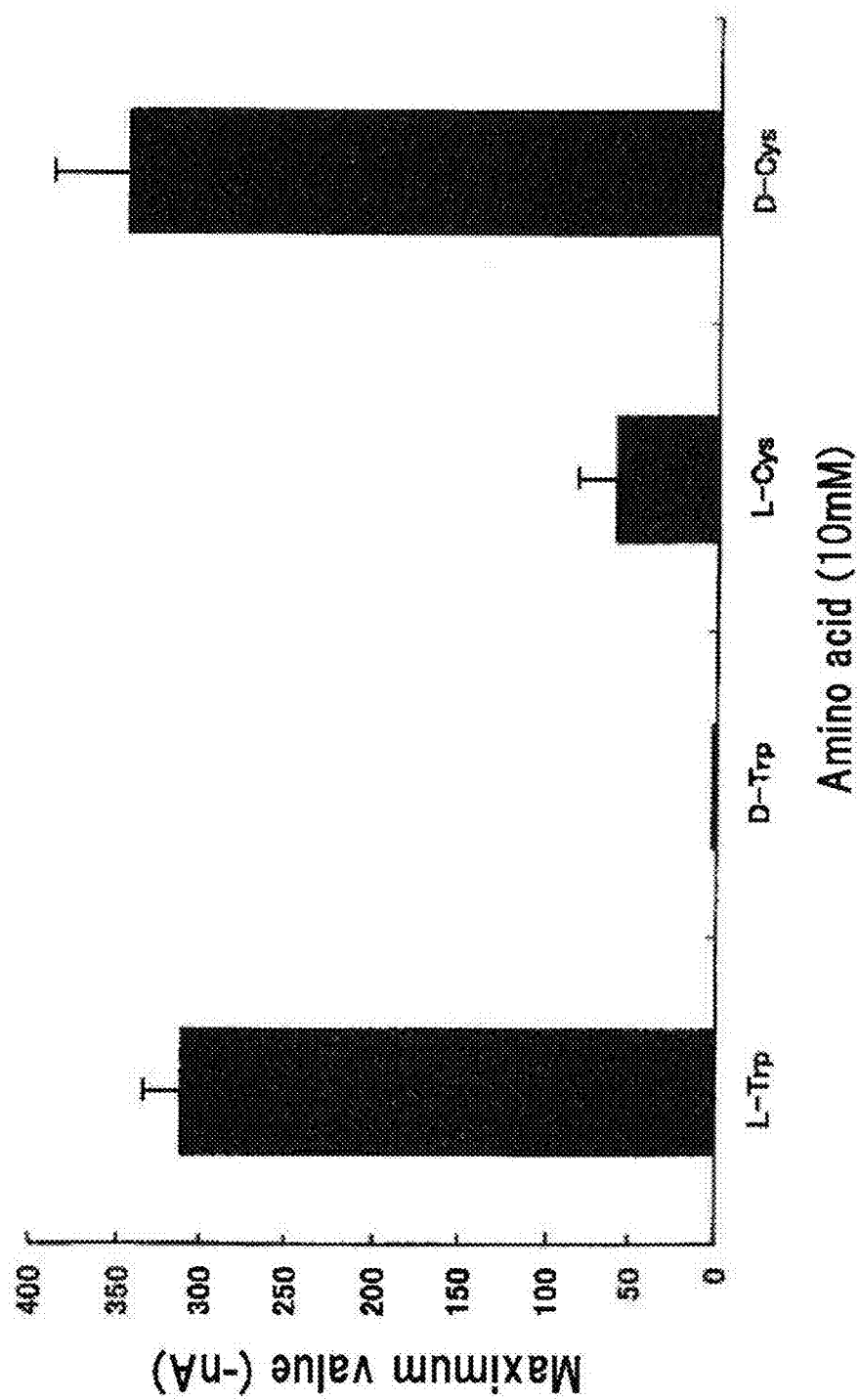
FIG. 3 is a graph showing an effect of a D-amino acid on a calcium receptor. cRNA of the human calcium receptor was injected into oocytes of *Xenopus laevis* by microinjection. The intracellular response current values were recorded when a 10 mM D-amino acid solution was added. The maximum value of the intracellular currents was defined as the response current value. It was confirmed that no response was observed in oocytes injected with distilled water by microinjection as a control.

The effect of D-cysteine for activating a calcium receptor was evaluated by using the method described in Reference Example 6. That is, oocytes injected with cRNA of the calcium receptor or sterilized water were prepared, and voltage-clamped at −70 mV by the double electrode voltage clamp method. To the voltage-clamped oocytes, D-cysteine (10 mM), L-cysteine (10 mM), D-tryptophan (10 mM) or L-tryptophan (10 mM) was added, and Ca ion concentration-dependent Cl response current was measured. FIG. 3 shows the results. From the results, it is demonstrated that D-cysteine had a definite calcium receptor-activating effect.

Reference Example 10

Evaluation of Effect of Peptide for Activating Calcium Receptor

Figure 4:
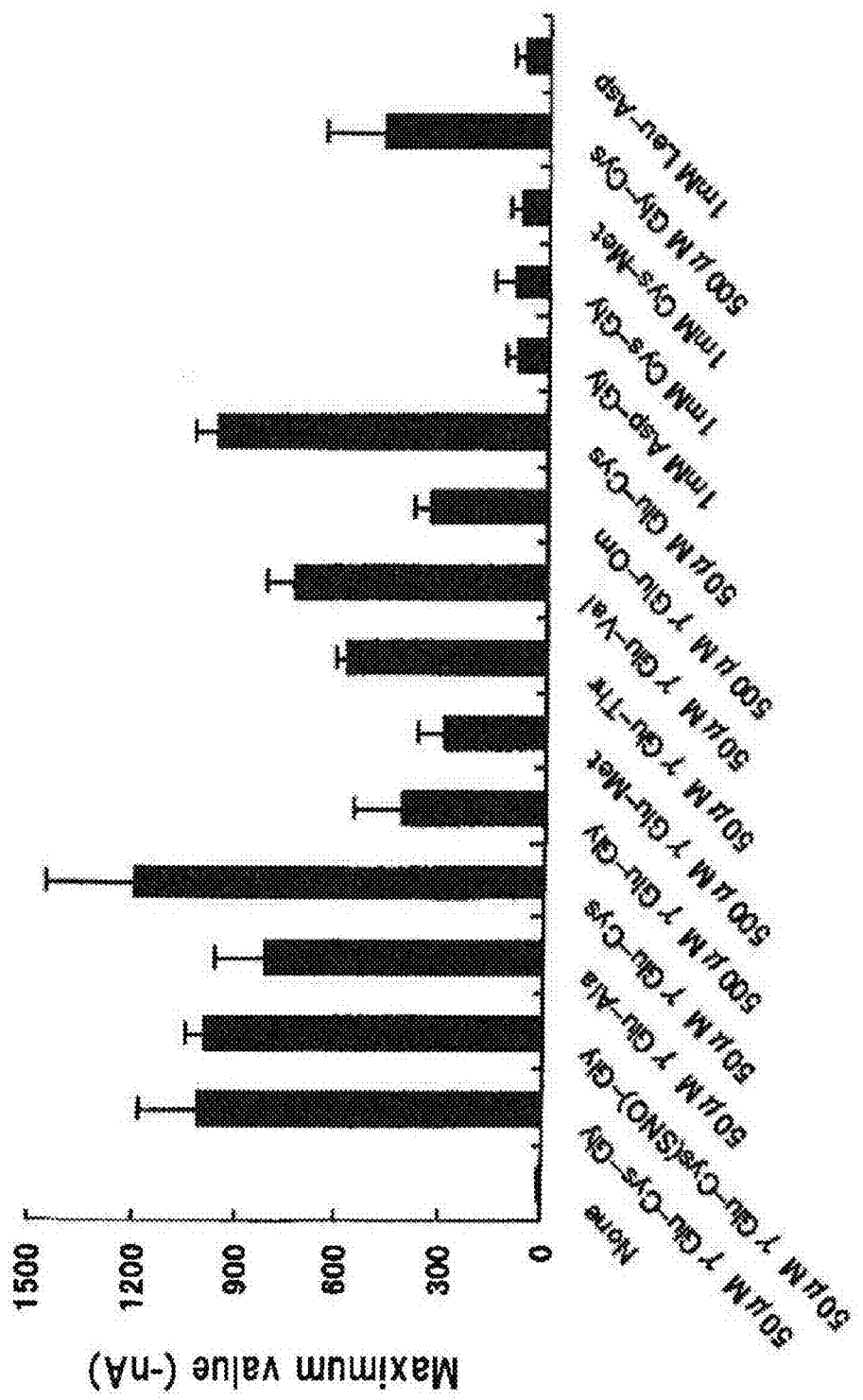
FIG. 4 is a graph showing an effect of a peptide on a calcium receptor. cRNA of the human calcium receptor was injected into oocytes of *Xenopus laevis* by microinjection. The intracellular response current values were recorded when a peptide solution was added at an arbitrary concentration. The maximum value of the intracellular response currents was defined as the response current value. It was confirmed that no response was observed in oocytes injected with distilled water by microinjection as a control.

The effect of peptide for activating calcium receptor was evaluated by using the method described in Reference Example 6. That is, oocytes injected with cRNA of the calcium receptor or sterilized water were prepared, and voltage-clamped at −70 mV by the double electrode voltage clamp method. To the voltage-clamped oocytes, γ-Glu-Cys-Gly (50 μM), γ-Glu-Cys(SNO)-Gly (50 μM), γ-Glu-Ala (50 μM), γ-Glu-Gly (500 μM), γ-Glu-Cys (50 μM), γ-Glu-Met (500 μM), γ-Glu-Thr (50 μM), γ-Glu-Val (50 μM), γ-Glu-Orn (500 μM), Asp-Gly (1 mM), Cys-Gly (1 mM), Cys-Met (1 mM), Glu-Cys (50 μM), Gly-Cys (500 μM) or Leu-Asp (1 mM) was added, and Ca ion concentration-dependent Cl response current was measured. FIG. 4 shows the results. From the results, it is demonstrated that the above-described peptide had a definite effect for activating calcium receptor.

Reference Example 11

Evaluation of Effect of Peptide for Activating Calcium Receptor

The ability of a peptide to activate calcium receptor was evaluated in the same manner as that of Reference Example 10. Each of the peptides shown in Table 1 was added to voltage-clamped oocytes at 1,000 μM, 300 μM, 100 μM, 30 μM, 10 μM, 3 μM, 1 μM, 0.3 μM and 0.1 μM, and Ca ion concentration-dependent Cl response current was measured. The lowest concentration at which current is detected was shown in Table 1 as the activity. From the results, it is revealed that the 32 kinds of peptides each had a calcium receptor-activating effect.

TABLE 1

| Number | Peptide | Activity |
| --- | --- | --- |
| 1 | γ-Glu-Met(O) | 1,000 μM |
| 2 | γ-Glu-Val-Val | 1,000 μM |
| 3 | γ-Glu-Val-Glu | 1,000 μM |
| 4 | γ-Glu-Val-Lys | 1,000 μM |
| 5 | γ-Glu-Val-Arg | 1,000 μM |
| 6 | γ-Glu-Val-Asp | 1,000 μM |
| 7 | γ-Glu-Val-Met | 1,000 μM |
| 8 | γ-Glu-Val-Thr | 1,000 μM |
| 9 | γ-Glu-γ-Glu-Val | 1,000 μM |
| 10 | γ-Glu-Val-NH2 | 1,000 μM |
| 11 | γ-Glu-Val-ol | 1,000 μM |
| 12 | γ-Glu-Ser | 300 μM |
| 13 | γ-Glu-Tau | 300 μM |
| 14 | γ-Glu-Cys(S-Me)(O) | 300 μM |
| 15 | γ-Glu-Val-His | 100 μM |
| 16 | γ-Glu-Val-Orn | 100 μM |
| 17 | γ-Glu-Leu | 100 μM |
| 18 | γ-Glu-Ile | 100 μM |
| 19 | γ-Glu-t-Leu | 100 μM |
| 20 | γ-Glu-Cys(S-allyl)-Gly | 100 μM |
| 21 | γ-Glu-Val-Asn | 30 μM |
| 22 | γ-Glu-Glyγ-Gly | 30 μM |
| 23 | γ-Glu-Val-Phe | 30 μM |
| 24 | γ-Glu-Val-Ser | 30 μM |

TABLE 1-continued

| Number | Peptide | Activity |
|---|---|---|
| 25 | γ-Glu-Val-Pro | 30 μM |
| 26 | γ-Glu-Ser-Gly | 30 μM |
| 27 | γ-Glu-Cys(S-Me) | 30 μM |
| 28 | γ-Glu-Val-Cys | 10 μM |
| 29 | γ-Glu-Val-Gln | 10 μM |
| 30 | γ-Glu-Abu-Gly | 3 μM |
| 31 | γ-Glu-Cys(S-Me)-Gly | 3 μM |
| 32 | γ-Glu-Val-Gly | 0.1 μM |

Reference Example 12

Kokumi-Imparting Activity of Peptide and Amino Acid

Typical examples include γ-Glu-X-Gly where X represents Cys(SNO), Cys(S-allyl), Gly, Cys(S-Me), Abu or Ser, γ-Glu-Val-Y where Y represents Gly, Val, Glu, Lys, Phe, Ser, Pro, Arg, Asp, Met, Thr, His, Orn, Asn, Cys or Gln, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu and γ-Glu-Cys(S-Me), in each of which a calcium receptor-activating effect was found, and the presence or absence of the kokumi-imparting activity was examined by a sensory evaluation test.

The sensory evaluation test was performed as follows. To distilled water containing sodium glutamate (0.05 g/dl), inosinic acid monophosphate (0.05 g/dl) and calcium chloride (1 mM), each of alliin (S-allyl-cysteine sulfoxide: control experiment of kokumi-imparting activity), γ-Glu-Cys-Gly, γ-Glu-Cys, γ-Glu-Ala and γ-Glu-Val was mixed as a sample in an amount of 0.2 g/dl, and the presence or absence of the kokumi-imparting activity was determined. As for a sample which is acidic when the sample is dissolved, pH of the sample was adjusted with NaOH to pH 6.8 to 7.2 before use. Table 2 shows the results.

TABLE 2

Kokumi-imparting activity of calcium receptor promoter

| Calcium receptor promoter | Kokumi-imparting activity |
|---|---|
| γ-Glu-Cys-Gly | + |
| γ-Glu-Cys | + |
| γ-Glu-Ala | + |
| γ-Glu-Val | + |

Reference Example 13

Kokumi-Imparting Activity of Peptide

A peptide in which a calcium receptor-activating effect was found was examined for the intensity of its kokumi-imparting activity by a quantitative sensory evaluation test.

The quantitative sensory evaluation test was performed as follows. To distilled water containing sodium glutamate (0.05 g/dl), inosinic acid monophosphate (0.05 g/dl) and sodium chloride (0.5 g/dl), each of γ-Glu-Cys-Gly (glutathione), γ-Glu-Ala, γ-Glu-Met and γ-Glu-Val was mixed as a sample in an amount of 0.1 g/dl, and the intensity of kokumi-imparting activity was measured. When a sample is acidic when dissolved, the pH was adjusted with NaOH to pH 6.8 to 7.2 before use. Because it is known that glutathione can impart kokumi to a food, glutathione was used as a comparative control. The test was performed with n=3 based on the following sensory evaluation scores: control was given 0 points, glutathione addition was given 3 points. Table 3 shows the results. It should be noted that the term "initial and middle taste" is a collective term of the initial taste and middle taste.

TABLE 3

| Sample | Concentration (g/dl) | Kokumi intensity Initial and middle taste | After-taste | Evaluation comments |
|---|---|---|---|---|
| Control | — | 0 | 0 | — |
| γ-Glu-Cys-Gly | 0.1 | 3.0 | 3.0 | Thickness, growth, and continuity are enhanced. |
| γ-Glu-Ala | 0.1 | 0.5 | 0.2 | The effect is weak, but thickness is slightly enhanced. |
| γ-Glu-Met | 0.1 | 1.5 | 0.4 | Thickness and growth are slightly enhanced. |
| γ-Glu-Val | 0.1 | 3.0 | 1.0 | Thickness and growth are enhanced mainly in initial and middle taste. |

Reference Example 14

Kokumi-Imparting Activity of Peptide

Peptides that are able to activate a calcium receptor were examined for kokumi-imparting activity by a quantitative sensory evaluation test.

The quantitative sensory evaluation test was performed as follows. To distilled water containing sodium glutamate (0.05 g/dl), inosinic acid monophosphate (0.05 g/dl) and sodium chloride (0.5 g/dl), each of γ-Glu-Cys-Gly (glutathione), γ-Glu-Cys, γ-Glu-Val and γ-Glu-Val-Gly was mixed as a sample in an amount of 0.1 g/dl, or 0.01 g/dl as required, and the intensity of kokumi-imparting activity was measured. When a sample is acidic when dissolved, the pH of the sample was adjusted with NaOH to pH 6.8 to 7.2 before use. The test was performed with n=5 based on the following sensory evaluation scores: control was given 0 point and glutathione addition was given 3 points. Table 4 shows the results.

TABLE 4

| Sample | Concentration (g/dl) | Kokumi intensity | | Taste profile |
|---|---|---|---|---|
| | | Initial and middle taste | After-taste | |
| Control | — | 0 | 0 | — |
| γ-Glu-Cys-Gly | 0.1 | 3.0 | 3.0 | Thickness, growth, and continuity are enhanced. |
| γ-Glu-Cys | 0.1 | 2.0 | 2.0 | A slightly weaker but comparable effect is exhibited compared with γ-Glu-Cys-Gly. |
| γ-Glu-Val | 0.1 | 3.0 | 1.0 | Thickness and growth are enhanced mainly in initial and middle taste. |
| γ-Glu-Val-Gly | 0.1 | * | * | * |
| γ-Glu-Val-Gly | 0.01 | 3.0 | 3.0 | Thickness and continuity are mainly enhanced. The whole taste is enhanced. |

* Unmeasurable: kokumi-imparting activity is too strong to measure by sensory evaluation.

Reference Example 15

Kokumi-Imparting Activity of Peptide

Peptides that activate a calcium receptor were examined for kokumi-imparting activity by a quantitative sensory evaluation test.

The quantitative sensory evaluation test was performed as follows. To distilled water containing sodium glutamate (0.05 g/dl), inosinic acid monophosphate (0.05 g/dl) and sodium chloride (0.5 g/dl), each of γ-Glu-Cys-Gly (glutathione), γ-Glu-Abu-Gly and γ-Glu-Val-Gly was mixed as a sample in an amount of 0.1 g/dl or 0.01 g/dl, and the intensity of kokumi-imparting activity was measured. As for a sample which is acidic when the sample is dissolved, pH of the sample was adjusted with NaOH to pH 6.8 to 7.2 before use. The test was performed with n=12 based on the following sensory evaluation scores: control: 0 point and glutathione addition: 3 points. Table 5 shows the results.

TABLE 5

| Sample | Concentration (g/dl) | Kokumi intensity | | Taste profile |
|---|---|---|---|---|
| | | Initial and middle taste | After-taste | |
| Control | — | 0 | 0 | — |
| γ-Glu-Cys-Gly | 0.1 | 3.0 | 3.0 | Thickness, growth, and continuity are enhanced. |
| γ-Glu-Abu-Gly | 0.01 | 3.0 | 2.0 | Thickness and growth are enhanced mainly in initial and middle taste. |
| γ-Glu-Val-Gly | 0.01 | 3.0 | 3.0 | Thickness and continuity are mainly enhanced. The whole taste is enhanced. |

Example 1

Activity of Compound on Sweetness (I)

A peptide, which is able to activate a calcium receptor and impart kokumi activity, was examined for activities such as improving body taste and bitterness of typical high-intensity sweeteners by a quantitative sensory evaluation test.

The quantitative sensory evaluation test was performed as follows. As for standard solutions of each sweetener, the following compounds were used. The following standard solutions were adjusted so that they each have almost the same degree of sweetness.
  i) Sucrose (5 g/dl)
  ii) APM (0.025 g/dl)
  iii) Sucralose (0.008 g/dl)
  iv) Ace-K (0.025 g/dl)

It should be noted that an addition effect of the peptides on each of the high-intensity sweeteners was evaluated with reference to sucrose.

To distilled water containing each of the above sweeteners, γ-Glu-Cys-Gly (glutathione), γ-Glu-Val-Gly, or γ-Glu-Abu-Gly was added and mixed at concentrations of 0.0001 to 1 g/dl, and then the degree of the improvement of the body taste and the improvement of the bitterness on the sweet taste was measured.

When one of the mixtures is more acidic than the standard control solution, the pH of the sample solution was adjusted with NaOH to achieve a range of pH±0.2 with respect to the pH of the standard solution before use.

The sensory evaluation for the improvement of the body taste was performed with n=12 on the basis of the following criteria: a control (obtained by adding distilled water only and without adding glutathione and/or the peptide) was defined as 0, and by using the control as a standard, the following were defined: weak: −2 points; slightly weak: −1 point; slightly strong: 1 point, and strong: 2 points. A higher score than 0 means that the sample improved the body taste.

Alternatively, the sensory evaluation for the improvement of the bitterness was performed with n=12 on the basis of the following criteria: a control (obtained by adding distilled water only and without adding glutathione and/or the peptide) was defined as 0, and by using the control as a standard, the following were defined: weak: −2 points; slightly weak: −1 point; slightly strong: 1 point, and strong: 2 points. A lower score than 0 means that the sample improves the bitterness.

As a result of the evaluation, the activities ranged widely at the above concentrations. Tables 6 to 8 each show the results at typical concentrations. As clear from the results shown in Tables 6, 7 and 8, it was confirmed that the peptides each are able to improve the body taste at a lower concentration than glutathione. Furthermore, it was also confirmed that the peptides are able to improve the bitterness. In general, the addition of the peptides results in an improvement of the body taste and a reduction in the bitterness, and results in a sweet taste similar to sucrose.

TABLE 6

| Sample ii) APM | Concentration (g/dl) | Body taste | Bitterness | Taste profile |
|---|---|---|---|---|
| Control | — | 0 | 0 | — |
| γ-Glu-Cys-Gly | 0.05 | 1.0 | −0.5 | Sweet taste is wholly enhanced. |
| γ-Glu-Val-Gly | 0.0001 | 0.5 | −0.2 | Sweet taste remaining in aftertaste is suppressed and sharpness is improved. |
| γ-Glu-Val-Gly | 0.001 | 1.3 | −0.5 | Sweet taste remaining in aftertaste is suppressed and sharpness is improved. |
| γ-Glu-Abu-Gly | 0.001 | 0.7 | −0.1 | Sweet taste is enhanced in initial taste and middle taste. Sweet taste remaining in aftertaste is suppressed. |
| γ-Glu-Abu-Gly | 0.001 | 1.5 | −0.1 | Sweet taste is enhanced in initial taste and middle taste. Sweet taste remaining in aftertaste is suppressed. |

TABLE 7

| Sample iii) sucralose | Concentration (g/dl) | Body taste | Bitterness | Taste profile |
|---|---|---|---|---|
| Control | — | 0 | 0 | — |
| γ-Glu-Cys-Gly | 0.05 | 1.0 | 0 | Sweet taste with growth is enhanced in middle taste. |
| γ-Glu-Val-Gly | 0.0001 | 0.7 | −0.1 | Outstanding sweet taste is harmonized in initial taste and aftertaste. |
| γ-Glu-Val-Gly | 0.001 | 1.3 | −0.2 | Outstanding sweet taste is harmonized in initial taste and aftertaste. |
| γ-Glu-Abu-Gly | 0.001 | 0.5 | −0.1 | Sweet taste is enhanced in initial taste and middle taste. Sweet taste remaining in aftertaste is suppressed. |
| γ-Glu-Abu-Gly | 0.01 | 1.0 | −0.1 | Sweet taste is enhanced in initial taste and middle taste. Sweet taste remaining in aftertaste is suppressed. |

TABLE 8

| Sample iv) Ace-K | Concentration (g/dl) | Body taste | Bitterness | Taste profile |
|---|---|---|---|---|
| Control | — | 0 | 0 | — |
| γ-Glu-Cys-Gly | 0.05 | 1.0 | −0.6 | Sweet taste is enhanced in middle taste to aftertaste. |

TABLE 8-continued

| Sample iv) Ace-K | Concentration (g/dl) | Body taste | Bitterness | Taste profile |
|---|---|---|---|---|
| γ-Glu-Val-Gly | 0.0001 | 0.7 | −0.6 | Sweet taste with growth is enhanced in middle taste. |
| γ-Glu-Val-Gly | 0.001 | 1.2 | −1.2 | Sweet taste with growth is enhanced in middle taste. Sweet taste is enhanced in initial taste and middle taste. |
| γ-Glu-Abu-Gly | 0.001 | 0.5 | −0.6 | Sweet taste remaining in aftertaste is suppressed. Sweet taste is enhanced in initial taste and middle taste. |
| γ-Glu-Abu-Gly | 0.01 | 1.1 | −1.2 | Sweet taste remaining in aftertaste is suppressed. |

Example 2

Activity of Compound on Sweet Taste (II)

Peptides able to activate a calcium receptor and impart kokumi activity were examined for their effects (improvement of body taste and improvement of bitterness) on products to which high-intensity sweeteners are typically added, by a quantitative sensory evaluation test.

The quantitative sensory evaluation test was performed as follows. As for a combination standard solution of each sweeteners, the following compounds were used. The following standard solutions have been adjusted so they each have almost the same degree of sweetness.

i) Sucrose (5 g/dl)
  ii) APM (0.02 g/dl)+Ace-K (0.005 g/dl) [APM:Ace-K=8:2 as a ratio of degrees of sweetness]
  iii) Sucralose (0.0058 g/dl)+Ace-K (0.0075 g/dl) [sucralose:Ace-K=7:3 as a ratio of degrees of sweetness]
  iv) APM (0.0125 g/dl)+sucralose (0.0042 g/dl) [APM:sucralose=1:1 as a ratio of degrees of sweetness]
  v) APM (0.0125 g/dl)+sucralose (0.0021 g/dl)+Ace-K (0.0063 g/dl) [APM:sucralose:Ace-K=2:1:1 as a ratio of degrees of sweetness]

It should be noted that an addition effect of the peptides on each of the high-intensity sweeteners was evaluated with reference to sucrose.

To distilled water containing each of the sweeteners, γ-Glu-Cys-Gly (glutathione), γ-Glu-Val-Gly or γ-Glu-Abu-Gly was added and mixed at concentrations of 0.0001 to 1 g/dl, and then the degree of the improvement of the body taste and the improvement of the bitterness on the sweet taste was measured. The addition effect of the peptides on each of the high-intensity sweeteners was evaluated with reference to sucrose.

When a mixture is more acidic than the standard control solution, the pH of the mixture was adjusted with NaOH to achieve a range of pH±0.2 with respect to the pH of the standard solution before use.

The sensory evaluation for the improvement of the body taste was performed with n=12 on the basis of the following criteria: a control (obtained by adding distilled water only and without adding glutathione and/or the peptide) was defined as 0, and by using the control as a standard, the follow were defined: weak: −2 points; slightly weak: −1 point; slightly strong: 1 point, and strong: 2 points. A higher score than 0 means that the sample has a body taste-improving effect.

Alternatively, the sensory evaluation for the improvement of the bitterness was performed with n=12 on the basis of the following criteria: a control (obtained by adding distilled water only and without adding glutathione and/or the peptide) was defined as 0, and by using the control as a standard, the following were defined: weak: −2 points; slightly weak: −1 point; slightly strong: 1 point, and strong: 2 points. A lower score than 0 means that the sample improves the bitterness.

As a result of the evaluation, activities ranged widely at the above concentrations. Tables 9 to 12 each show the results at typical concentrations. As clear from the results shown in Tables 9 to 12, it was confirmed that the peptides each has a body taste-improving effect at a lower concentration than glutathione. Furthermore, it was also confirmed that the peptide has a bitterness-improving effect. In general, the addition of the peptides results in the improvement of the body taste and the reduction in the bitterness, and results in a sweet taste similar to sucrose.

TABLE 9

| Sample ii) APM: Ace-K = 8:2 | Concentration (g/dl) | Body taste | Bitterness | Taste profile |
|---|---|---|---|---|
| Control | — | 0 | 0 | — |
| γ-Glu-Cys-Gly | 0.05 | 1.0 | −0.3 | Sweet taste is wholly enhanced. |
| γ-Glu-Val-Gly | 0.0001 | 0.6 | −0.3 | Sweet taste with growth is enhanced in middle taste. Sweet taste remaining in aftertaste is suppressed and sharpness is improved. |

TABLE 9-continued

| Sample ii) | | Taste | | |
|---|---|---|---|---|
| APM: Ace-K = 8:2 | Concentration (g/dl) | Body taste | Bitterness | Taste profile |
| γ-Glu-Val-Gly | 0.001 | 1.3 | −0.7 | Sweet taste remaining in aftertaste is suppressed and sharpness is improved. |
| γ-Glu-Abu-Gly | 0.001 | 0.6 | −0.3 | Sweet taste is enhanced in initial taste and middle taste. Sweet taste remaining in aftertaste is suppressed. |
| γ-Glu-Abu-Gly | 0.01 | 1.3 | −0.7 | Sweet taste is enhanced in initial taste and middle taste. Sweet taste remaining in aftertaste is suppressed. |

TABLE 10

| Sample iii) | | Taste | | |
|---|---|---|---|---|
| sucralose: Ace-K = 7:3 | Concentration (g/dl) | Body taste | Bitterness | Taste profile |
| Control | — | 0 | 0 | — |
| γ-Glu-Cys-Gly | 0.05 | 1.0 | −0.3 | Sweet taste is enhanced in middle taste. |
| γ-Glu-Val-Gly | 0.0001 | 0.7 | −0.3 | Harmony is wholly present. Heavy taste is suppressed and sharpness is improved. |
| γ-Glu-Val-Gly | 0.001 | 1.3 | −0.7 | Harmony is wholly present. Heavy taste is suppressed and sharpness is improved. |
| γ-Glu-Abu-Gly | 0.001 | 0.5 | −0.3 | Sweet taste is enhanced in initial taste and middle taste. Sweet taste remaining in aftertaste is suppressed. |
| γ-Glu-Abu-Gly | 0.01 | 1.1 | −0.7 | Sweet taste is enhanced in initial taste and middle taste. Sweet taste remaining in aftertaste is suppressed. |

TABLE 11

| Sample iv) | | Taste | | |
|---|---|---|---|---|
| APM: sucralose = 1:1 | Concentration g/dl | Body taste | Bitterness | Taste profile |
| Control | — | 0 | 0 | — |
| γ-Glu-Cys-Gly | 0.05 | 1.0 | −0.3 | Sweet taste is enhanced in middle taste. |
| γ-Glu-Val-Gly | 0.0001 | 0.6 | −0.2 | Harmony is wholly present and strong taste is achieved. |
| γ-Glu-Val-Gly | 0.001 | 1.3 | −0.4 | Harmony is wholly present and strong taste is achieved. |
| γ-Glu-Abu-Gly | 0.001 | 0.6 | −0.1 | Harmony is present. Sweet taste is enhanced in initial taste and middle taste. |
| γ-Glu-Abu-Gly | 0.01 | 1.3 | −0.1 | Harmony is present. Sweet taste is enhanced in initial taste and middle taste. |

TABLE 12

| Sample v) APM sucralose: Ace-K = 2:1:1 | Concentration (g/dl) | Taste | | |
|---|---|---|---|---|
| | | Body taste | Bitterness | Taste profile |
| Control | — | 0 | 0 | — |
| γ-Glu-Cys-Gly | 0.05 | 1.2 | −0.3 | Sweet taste is wholly enhanced. |
| γ-Glu-Val-Gly | 0.0001 | 0.6 | −0.3 | Harmony is wholly present. Heavy taste is suppressed and sharpness in aftertaste is improved. |
| γ-Glu-Val-Gly | 0.001 | 1.3 | −0.7 | Harmony is wholly present. Heavy taste is suppressed and sharpness in aftertaste is improved. |
| γ-Glu-Abu-Gly | 0.001 | 0.6 | −0.4 | Sweet taste is enhanced in initial taste and middle taste. Sweet taste remaining in aftertaste is suppressed. |
| γ-Glu-Abu-Gly | 0.01 | 1.3 | −0.8 | Sweet taste is enhanced in initial taste and middle taste. Sweet taste remaining in aftertaste is suppressed. |

Example 3

Activity of Compound on Sweetness (III)

Peptides which are able to activate a calcium receptor and impart kokumi activity, and cinacalcet which is known to be able to activate a calcium receptor, were examined for their activities (improvement of body taste and improvement of bitterness) on typical high-intensity sweeteners by a quantitative sensory evaluation test.

The quantitative sensory evaluation test was performed as follows. As for standard solutions of each sweetener, the following compounds were used. The following standard solutions have been adjusted so as they each have almost the same degree of sweetness.

i) Sucrose (5 g/dl)
ii) APM (0.025 g/dl)
iii) Sucralose (0.008 g/dl)
iv) Ace-K (0.025 g/dl)

It should be noted that an addition effect of the samples on each of the high intensity sweeteners was evaluated with reference to sucrose.

To distilled water containing each sweeteners, γ-Glu-Val-Gly or cinacalcet was mixed as a sample at concentrations of 0.0001 to 1 g/dl, respectively, and then each degree of the improvement of the body taste and the improvement of the bitterness on the sweet taste was measured.

When a mixture is more acidic than the standard control solution, the pH of the mixture was adjusted with NaOH to achieve a range of pH±0.2 with respect to the pH of the standard solution before use.

The sensory evaluation for the improvement of the body taste was performed with n=12 on the basis of the following criteria: a control (obtained by adding distilled water only and without adding a sample) was defined as 0, and by using the control as a standard, the following were defined: weak: −2 points; slightly weak: −1 point; slightly strong: 1 point, and strong: 2 points. A higher score than 0 means that the sample improves the body taste.

Alternatively, the sensory evaluation for the improvement of the bitterness was performed with n=12 on the basis of the following criteria: a control (obtained with adding distilled water only and without adding a sample) was defined as 0, and by using the control as a standard, the following were defined: weak: −2 points; slightly weak: −1 point; slightly strong: 1 point, and strong: 2 points. A lower score than 0 means that the sample improves the bitterness.

As a result of the evaluation, activities ranged widely at the above concentrations. Tables 13 to 15 each show the results at typical concentrations. As clear from the results shown in Tables 13 to 15, it is confirmed that γ-Glu-Val-Gly and cinacalcet each improve the body taste at almost the same concentration. Furthermore, it is also confirmed that the sample improves the bitterness. In general, the addition of the sample provides the improvement of the body taste and the reduction in the bitterness, and results in sweet taste close to sucrose.

TABLE 13

| Sample ii) APM | Concentration (g/dl) | Taste | | |
|---|---|---|---|---|
| | | Body taste | Bitterness | Taste profile |
| Control | — | 0 | 0 | — |
| γ-Glu-Val-Gly | 0.0001 | 0.5 | −0.2 | Sweet taste remaining in aftertaste is suppressed and sharpness is improved. |
| γ-Glu-Val-Gly | 0.001 | 1.3 | −0.5 | Sweet taste remaining in aftertaste is suppressed and sharpness is improved. |

TABLE 13-continued

| Sample ii) APM | Concentration (g/dl) | Body taste | Bitterness | Taste profile |
|---|---|---|---|---|
| Cinacalcet | 0.0001 | 0.8 | −0.2 | Sweet taste remaining in aftertaste is suppressed. Growth is present in middle taste to aftertaste. |
| Cinacalcet | 0.001 | 1.5 | −0.5 | Sweet taste remaining in aftertaste is suppressed. Growth is present in middle taste to aftertaste. |

TABLE 14

| Sample iii) sucralose | Concentration (g/dl) | Body taste | Bitterness | Taste profile |
|---|---|---|---|---|
| Control | — | 0 | 0 | — |
| γ-Glu-Val-Gly | 0.0001 | 0.7 | −0.1 | Outstanding sweet taste is harmonized in initial taste and aftertaste. |
| γ-Glu-Val-Gly | 0.001 | 1.3 | −0.2 | Outstanding sweet taste is harmonized in initial taste and aftertaste. |
| Cinacalcet | 0.0001 | 0.5 | −0.1 | Outstanding sweet taste is harmonized in initial taste and aftertaste. |
| Cinacalcet | 0.001 | 1.1 | −0.2 | Outstanding sweet taste is harmonized in initial taste and aftertaste. |

TABLE 15

| Sample iv) Ace-K | Concentration (g/dl) | Body taste | Bitterness | Taste profile |
|---|---|---|---|---|
| Control | — | 0 | 0 | — |
| γ-Glu-Val-Gly | 0.0001 | 0.7 | −0.6 | Sweet taste with growth is enhanced in middle taste. |
| γ-Glu-Val-Gly | 0.001 | 1.2 | −1.2 | Sweet taste with growth is enhanced in middle taste. |
| Cinacalcet | 0.0001 | 0.6 | −0.2 | Sweet taste with growth is enhanced in middle taste to aftertaste. |
| Cinacalcet | 0.001 | 1.1 | −0.3 | Sweet taste with growth is enhanced in middle taste to aftertaste. |

Example 4

Activity of Compound on Sweetness (IV)

Peptides able to activate a calcium receptor and impart a kokumi activity, and cinacalcet which is known to have a calcium receptor-activating effect, were examined for their effects (improvement of body taste and improvement of bitterness) on products to which high-intensity sweeteners are typically added, by a quantitative sensory evaluation test.

The quantitative sensory evaluation test was performed as follows. As for combination standard solution of each sweeteners, the following compound was used. The following standard solutions have been adjusted so they each have almost the same degree of sweetness.

i) Sucrose (5 g/dl)
ii) APM (0.02 g/dl)+Ace-K (0.005 g/dl) [APM:Ace-K=8:2 as a ratio of degrees of sweetness]
iii) Sucralose (0.0058 g/dl)+Ace-K (0.0075 g/dl) [sucralose:Ace-K=7:3 as a ratio of degrees of sweetness]
iv) APM (0.0125 g/dl)+sucralose (0.0042 g/dl) [APM:sucralose=1:1 as a ratio of degrees of sweetness]
v) APM (0.0125 g/dl)+sucralose (0.0021 g/dl)+Ace-K (0.0063 g/dl) [APM:sucralose:Ace-K=2:1:1 as a ratio of degrees of sweetness]

It should be noted that an addition effect of the peptides on each of the high-intensity sweeteners was evaluated with reference to sucrose.

To distilled water containing each sweetener mentioned above, γ-Glu-Val-Gly or cinacalcet was added and mixed at concentrations of 0.0001 to 1 g/dl, and then each degree of the improvement of the body taste and the improvement of the bitterness on the sweet taste was measured. The addition effect of the sample on each of the high intensity sweeteners was evaluated with reference to sucrose.

When a mixture is more acidic than the standard control solution, the pH of the sample was adjusted with NaOH to achieve a range of pH±0.2 with respect to the pH of the standard solution before use.

The sensory evaluation for the improvement of the body taste was performed with n=12 on the basis of the following criteria: a control (obtained with adding distilled water only and without adding the sample) was defined as 0, and by using the control as a standard, the following were defined: weak: −2 points; slightly weak: −1 point; slightly strong: 1 point, and strong: 2 points. A higher score than 0 means that the sample improves the body taste.

Alternatively, the sensory evaluation for the improvement of the bitterness was performed with n=12 on the basis of the following criteria: a control (obtained with adding distilled water only and without adding the sample) was defined as 0, and by using the control as a standard, the following were defined: weak: −2 points; slightly weak: −1 point; slightly strong: 1 point, and strong: 2 points. A lower score than 0 means that the sample improves the bitterness.

As a result of the evaluation, activities ranged widely at the above concentrations. Tables 16 to 19 each show the results at typical concentrations. As clear from the results shown in Tables 16 to 19, it is confirmed that γ-Glu-Val-Gly and cinacalcet each improves the body taste at almost the same concentration. Furthermore, it was also confirmed the sample improves the bitterness. In general, the addition of the sample provides the improvement of the body taste and the reduction in the bitterness, and results in a sweet taste similar to sucrose.

TABLE 16

| Sample ii) APM: Ace-K = 8:2 | Concentration (g/dl) | Body taste | Bitterness | Taste profile |
|---|---|---|---|---|
| Control | — | 0 | 0 | — |
| γ-Glu-Val-Gly | 0.0001 | 0.6 | −0.3 | Sweet taste with growth is enhanced in middle taste. Sweet taste remaining in aftertaste is suppressed and sharpness is improved. |
| γ-Glu-Val-Gly | 0.001 | 1.3 | −0.7 | Sweet taste remaining in aftertaste is suppressed and sharpness is improved. |
| Cinacalcet | 0.0001 | 0.5 | −0.1 | Sweet taste with growth is enhanced in middle taste to aftertaste. |
| Cinacalcet | 0.001 | 1.1 | −0.3 | Sweet taste with growth is enhanced in middle taste to aftertaste. |

TABLE 17

| Sample iii) sucralose: Ace-K = 7:3 | Concentration (g/dl) | Body taste | Bitterness | Taste profile |
|---|---|---|---|---|
| Control | — | 0 | 0 | — |
| γ-Glu-Val-Gly | 0.0001 | 0.7 | −0.3 | Harmony is wholly present. Heavy taste is suppressed and sharpness is improved. |
| γGlu-Val-Gly | 0.001 | 1.3 | −0.7 | Harmony is wholly present. Heavy taste is suppressed and sharpness is improved. |
| Cinacalcet | 0.0001 | 0.8 | −0.1 | Sweet taste with thickness and growth is enhanced in middle taste to aftertaste. |
| Cinacalcet | 0.001 | 1.5 | −0.3 | Sweet taste with thickness and growth is enhanced in middle taste to aftertaste. |

TABLE 18

| Sample iv) APM: sucralose = 1:1 | Concentration (g/dl) | Body taste | Bitterness | Taste profile |
|---|---|---|---|---|
| Control | — | 0 | 0 | — |
| γ-Glu-Val-Gly | 0.0001 | 0.6 | −0.2 | Harmony is wholly present and strong taste is achieved. |

TABLE 18-continued

| Sample iv) APM: sucralose = 1:1 | Concentration (g/dl) | Taste | | |
|---|---|---|---|---|
| | | Body taste | Bitterness | Taste profile |
| γ-Glu-Val-Gly | 0.001 | 1.3 | −0.4 | Harmony is wholly present and strong taste is achieved. |
| Cinacalcet | 0.0001 | 0.5 | −0.2 | Sweet taste with thickness and growth is enhanced in middle taste. |
| Cinacalcet | 0.001 | 1.1 | −0.2 | Sweet taste with thickness and growth is enhanced in middle taste. |

TABLE 19

| Sample v) APM sucralose: Ace-K = 2:1:1 | Concentration (g/dl) | Taste | | |
|---|---|---|---|---|
| | | Body taste | Bitterness | Taste profile |
| Control | — | 0 | 0 | — |
| γ-Glu-Val-Gly | 0.0001 | 0.6 | −0.3 | Harmony is wholly present. Heavy taste is suppressed and sharpness in aftertaste is improved. |
| γ-Glu-Val-Gly | 0.001 | 1.3 | −0.7 | Harmony is wholly present. Heavy taste is suppressed and sharpness in aftertaste is improved. |
| Cinacalcet | 0.0001 | 0.5 | −0.2 | Harmony and richness are present in middle taste to aftertaste. |
| Cinacalcet | 0.001 | 1.1 | −0.4 | Harmony and richness are present in middle taste to aftertaste. |

Example 5

Activity of the Compound in Drinkable Yogurt Containing High Intensity Sweetener Peptides which are able to activate a calcium receptor and impart a kokumi activity, and cinacalcet which is known to have a calcium receptor-activating effect, were examined for their activities (improvement of body taste and improvement of bitterness) in a drinkable yogurt containing a typical high intensity sweetener by a quantitative sensory evaluation test.

The quantitative sensory evaluation test was performed as follows. As for a drinkable yogurt standard solution, the following compounds were used. The following standard solutions have been adjusted so they each have almost the same degree of sweetness.

i) Sucrose (5 g/dl)
ii) APM (0.025 g/dl)

It should be noted that an addition effect of the sample on each of the high intensity sweeteners was evaluated with reference to sucrose.

To a drinkable yogurt containing each of the sweeteners, γ-Glu-Val-Gly or cinacalcet was added and mixed at concentrations 0.0001 to 1 g/dl, and then each degree of the improvement of the body taste and the improvement of the bitterness on the sweet taste was measured.

When a mixture is more acidic than the standard control solution, the pH of the sample was adjusted with NaOH to achieve a range of pH±0.2 with respect to the pH of the standard solution before use.

The sensory evaluation for the improvement of the body taste was performed with n=12 on the basis of the following criteria: a control (obtained with adding distilled water only and without adding the sample) was defined as 0, and by using the control as a standard, the following were defined: weak: −2 points; slightly weak: −1 point; slightly strong: 1 point, and strong: 2 points. A higher score than 0 means that the sample has a body taste-improving effect.

On the other hand, the sensory evaluation for the improvement of the bitterness was performed with n=12 on the basis of the following criteria: a control (obtained with adding distilled water only and without adding the sample) was defined as 0, and by using the control as a standard, the following were defined: weak: −2 points; slightly weak: −1 point; slightly strong: 1 point, and strong: 2 points. A lower score than 0 means that the sample improves the bitterness.

As a result of the evaluation, activities ranged widely at the above concentrations. Table 20 shows the results at typical concentrations. As clear from the results shown in Table 20, it is confirmed that γ-Glu-Val-Gly and cinacalcet each improves the body taste at almost the same concentration. Furthermore, it was also confirmed that the sample improves the bitterness. In general, the addition of the sample provides the improvement of the body taste and the reduction in the bitterness, and results in a sweet taste close to sucrose.

TABLE 20

| Sample ii) APM | Concentration (g/dl) | Body taste | Bitterness | Taste profile |
|---|---|---|---|---|
| Control | — | 0 | 0 | — |
| γ-Glu-Val-Gly | 0.0001 | 0.5 | −0.2 | Sweet taste remaining in aftertaste is suppressed. |
| γ-Glu-Val-Gly | 0.001 | 1.4 | −0.5 | Growth is present in middle taste. Sweet taste remaining in aftertaste is suppressed. |
| Cinacalcet | 0.0001 | 0.5 | −0.2 | Sweet taste remaining in aftertaste is suppressed. |
| Cinacalcet | 0.001 | 1.6 | −0.1 | Thickness is present. Sweet taste remaining in aftertaste is suppressed. |

INDUSTRIAL APPLICABILITY

The use of the sweetener, in particular, the high intensity sweetener such as aspartame in combination with the compound having a calcium receptor-activating effect, preferably the amino acid or the peptide, improves the body taste or the bitterness of the high intensity sweetener such as aspartame. The sweetener which has the improved body taste and bitterness of the sweet taste can be widely utilized for general foods such as beverages and water ices.

Further, the compound having a calcium receptor-activating effect can be widely utilized as an additive agent capable of improving the body taste and the bitterness of the sweetener, in particular, the high-intensity sweetener.

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A composition comprising a sweetener and a compound; wherein the compound is selected from the group consisting of γ-Glu-X-Gly, γ-Glu-Val-Y, and combinations thereof; wherein X is selected from the group consisting of Gly, Abu, t-Leu, Cle, Aib, Pen and Ser; and Y is selected from the group consisting of Gly, Val, Glu, Lys, Phe, Ser, Pro, Arg, Asp, Met, Thr, His, Orn, Asn, Cys, Gln, GlyA and LacA;
wherein the compound is present in the composition in an amount of from 0.000001% to 99.9999% by weight.

2. The composition according to claim 1, wherein the compound is selected from the group consisting of γ-Glu-Val-Gly and γ-Glu-Abu-Gly.

3. The composition according to claim 1, wherein the sweetener is selected from the group consisting of aspartame, sucralose, acesulfame K, neotame, N—[N-[3-(3-hydroxy-4-methoxyphenyl)propyl]-α-aspartyl]-L-phenylalanine 1-methyl ester, saccharin, stevia, glycyrrhizin, thaumatin, monatin, and monellin.

4. The composition of claim 1, wherein said compound improves a body taste of the sweetener.

SEQUENCE LISTING

<160> NUMBER OF SEQ ID NOS: 2

<210> SEQ ID NO 1
<211> LENGTH: 49
<212> TYPE: DNA
<213> ORGANISM: Artificial Sequence
<220> FEATURE:
<223> OTHER INFORMATION: hCASR_N primer

<400> SEQUENCE: 1
actaatacga ctcactatag ggaccatggc attttatagc tgctgctgg          49

<210> SEQ ID NO 2
<211> LENGTH: 29
<212> TYPE: DNA
<213> ORGANISM: Artificial Sequence
<220> FEATURE:
<223> OTHER INFORMATION: hCASR_C primer

<400> SEQUENCE: 2
ttatgaattc actacgtttt ctgtaacag          29

5. The composition of claim 1, wherein said compound improves a bitterness of the sweetener.

6. The composition according to claim 1, wherein the sweetener is a high-intensity sweetener.

7. The compositions according to claim 1, wherein X is selected from the group consisting of Gly, Ala, Val, Leu, Ile, Ser, Thr, Met, Asn, Gln, Pro, Hyp, t-Leu, Asp, Glu, Lys, Arg, His, Phe, Tyr, Trp, homoserine, citrulline, ornithine, α-aminobutyric acid, norvaline, norleucine, taurine, tert-leucine, cycloleucine, α-aminoisobutyric acid, and L-penicillamine.

* * * * *